US012250523B2

(12) United States Patent
Chenal

(10) Patent No.: US 12,250,523 B2
(45) **Date of Patent: *Mar. 11, 2025**

(54) APPARATUS AND METHOD FOR AN EARPIECE

(71) Applicant: JMJ Holdings, LLC, Frederic, WI (US)

(72) Inventor: David M. Chenal, Frederic, WI (US)

(73) Assignee: JMJ Holdings, LLC, Frederic, WI (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/287,863

(22) PCT Filed: Apr. 21, 2022

(86) PCT No.: PCT/US2022/025793

§ 371 (c)(1), (2) Date: Oct. 20, 2023

(87) PCT Pub. No.: WO2022/226213

PCT Pub. Date: Oct. 27, 2022

(65) Prior Publication Data

US 2024/0205622 A1 Jun. 20, 2024

Related U.S. Application Data

(63) Continuation of application No. 29/780,178, filed on Apr. 22, 2021, now Pat. No. Des. 952,831.

(51) Int. Cl.
*H04R 25/00* (2006.01)

(52) U.S. Cl.
CPC .................................. *H04R 25/652* (2013.01)

(58) Field of Classification Search
CPC H04R 25/652; H04R 2460/13; H04R 25/606; H04R 1/1016; H04R 2410/05;

(Continued)

(56) References Cited

U.S. PATENT DOCUMENTS

| | | | |
|---|---|---|---|
| 3,783,864 | A | 1/1974 | Moller |
| 4,498,469 | A | 2/1985 | Csiki |

(Continued)

FOREIGN PATENT DOCUMENTS

| | | | |
|---|---|---|---|
| DE | 4217043 | A1 | 11/1992 |
| ES | 2028711 | | 7/1992 |

(Continued)

OTHER PUBLICATIONS

Surefire, LLC, Fountain Valley, California, "EP8 Sonic Defenders", "downloaded from: https://web.archive.org/web/20130524145837/http://www.surefire.com/ep8-sonic-defenders-cobalt.html", May 24, 2013.

(Continued)

*Primary Examiner* — Ophelia A Hawthorne
(74) *Attorney, Agent, or Firm* — Charles A. Lemaire; Lemaire Patent Law Firm, P.L.L.C.

(57) ABSTRACT

A sound attenuation system that includes a pliable stem for an earpiece and an earpiece incorporating the stem. The stem includes a curved sound-attenuating distal flange and an attachment portion configured to receive and retain a visco-elastic foam sound-attenuating element in a spaced-apart relation to the curved sound-attenuating distal flange, and a handle portion. The sound-attenuating stem and the foam sound-attenuating element together are configured to fit into the user's ear with improved comfort and flexibility. Some embodiments include a sound-conducting stem channel extending lengthwise through the stem. Some embodiments further include a sound filter configured to insert into the sound-conducting channel in the handle portion, the sound filter including lengthwise filter channel open to the stem channel, and a cover selectably movable to occlude the filter channel or to open the filter channel to external sounds and air pressure.

12 Claims, 18 Drawing Sheets

(58) Field of Classification Search

CPC .... H04R 31/00; A61F 11/08; A61F 2011/085; A61F 11/12; A61F 11/00; A61F 11/06; A61F 2002/183; A61F 2/18; H01L 2224/48091; H01L 2924/00014; Y10T 29/49005; Y10T 29/43; Y10T 29/4908; Y10T 29/49002; Y10T 82/2593

See application file for complete search history.

(56) References Cited

U.S. PATENT DOCUMENTS

| | | | |
|---|---|---|---|
| 5,113,967 | A | 5/1992 | Killion et al. |
| 5,488,205 | A | 1/1996 | Major |
| 5,631,965 | A | 5/1997 | Chang |
| 5,957,136 | A | 9/1999 | Magidson |
| 6,148,821 | A | 11/2000 | Falco |
| 6,938,622 | B2 | 9/2005 | Huang |
| D523,845 | S | 6/2006 | Smith et al. |
| 7,236,605 | B2 | 6/2007 | Oliviera et al. |
| 7,394,910 | B2 | 7/2008 | Smith et al. |
| 7,512,243 | B2 | 3/2009 | Haussmann |
| 7,600,604 | B2 | 10/2009 | Babcock et al. |
| 7,743,771 | B2 | 6/2010 | Falco |
| 7,778,435 | B2 | 8/2010 | Smith et al. |
| 7,837,005 | B2 | 11/2010 | Killion |
| 7,934,916 | B2 | 5/2011 | Smith et al. |
| 7,967,015 | B2 | 6/2011 | Jenkins |
| 8,101,103 | B2 | 1/2012 | Tiemens et al. |
| 8,113,207 | B2 | 2/2012 | Gehling et al. |
| 8,161,975 | B2 | 4/2012 | Turdjian |
| 8,224,005 | B2 | 7/2012 | Smith |
| 8,327,973 | B2 | 12/2012 | Parish et al. |
| 8,596,279 | B2 | 12/2013 | Falco |
| 8,611,969 | B2 | 12/2013 | Smith et al. |
| 8,625,834 | B2 | 1/2014 | Smith et al. |
| 8,679,607 | B2 | 3/2014 | Hamer et al. |
| 8,820,470 | B2 | 9/2014 | Brown |
| 8,879,769 | B2 | 11/2014 | Smith et al. |
| D727,301 | S | 4/2015 | Smith et al. |
| 9,042,947 | B2 | 5/2015 | Smith et al. |
| 9,088,847 | B2 | 7/2015 | Young-Mun |
| D771,599 | S | 11/2016 | Kim |
| 9,603,746 | B2 | 3/2017 | Chenal |
| 9,737,439 | B2 | 8/2017 | Endle et al. |
| 9,814,625 | B2 | 11/2017 | Ely |
| D815,619 | S | 4/2018 | Moudgill et al. |
| D819,594 | S | 6/2018 | Hosoda et al. |
| 10,231,048 | B2 | 3/2019 | Smith et al. |
| 10,440,459 | B2 | 10/2019 | Smith et al. |
| 11,229,552 | B1 | 1/2022 | Chenal |
| 2002/0096391 | A1 | 7/2002 | Smith et al. |
| 2002/0181729 | A1 | 12/2002 | Smith |
| 2003/0029460 | A1 | 2/2003 | Tiemens |
| 2003/0116165 | A1 | 6/2003 | Huang |
| 2003/0159878 | A1 | 8/2003 | Hakansson et al. |
| 2007/0221232 | A1* | 9/2007 | Jenkins .................. A61F 11/08 181/131 |
| 2008/0181441 | A1 | 7/2008 | Smith |
| 2008/0245372 | A1 | 10/2008 | Smith |
| 2008/0247561 | A1 | 10/2008 | Smith |
| 2008/0253605 | A1 | 10/2008 | Smith |
| 2009/0141923 | A1 | 6/2009 | Smith |
| 2010/0195860 | A1 | 8/2010 | Becker |
| 2011/0303227 | A1* | 12/2011 | Pick ........................ A61F 11/08 264/571 |
| 2014/0105442 | A1 | 4/2014 | Smith et al. |
| 2014/0254842 | A1 | 9/2014 | Smith et al. |
| 2015/0043767 | A1 | 2/2015 | Smith |
| 2015/0047651 | A1 | 2/2015 | Haapapuro et al. |
| 2015/0335489 | A1 | 11/2015 | Hamer et al. |
| 2020/0252711 | A1 | 8/2020 | Smith et al. |

FOREIGN PATENT DOCUMENTS

| | | |
|---|---|---|
| GB | _2407274 | 4/2005 |
| WO | WO_2009081067 | 7/2009 |

OTHER PUBLICATIONS

"PCT International Preliminary Report on Patentability for parent PCT/US2022/025793 application, mailed Nov. 6, 2023, 20 pages.".

* cited by examiner 1501
1510
1511
1512
1520
1521
1530
1539
1549
1601
1661
1660
1671
1670
1681
1680
1686
1666
1646
1645
1649
1699
1667
1691
1527
1557
1502
1503
1514
1516
1531
1532
1536
1537
1540
1541
1542
1545
1546
1550
1551
1552
1556
1558
1522
1523
1524
1591
1592
1598
1599

APPARATUS AND METHOD FOR AN EARPIECE

CROSS-REFERENCE TO RELATED APPLICATIONS

This application is a national-stage filing of, and claims priority benefit of, international Patent Application No. PCT/US2022/025793, filed Apr. 21, 2022 by David M. Chenal and titled "Apparatus and method for an earpiece," which claims priority benefit of U.S. Design patent application Ser. No. 29/780,178, filed on Apr. 22, 2021 by David M. Chenal and titled "Earpiece apparatus," each of which is incorporated herein by reference in its entirety.

This application is related to:

- U.S. patent application Ser. No. 15/130,417, filed Apr. 15, 2016 (which issued as U.S. Pat. No. 9,603,746 on Mar. 28, 2017) by JMJ Holdings, LLC, titled "SOUND ATTENUATION";
- U.S. patent application Ser. No. 15/566,699, filed Oct. 14, 2017 (which issued as U.S. Pat. No. 10,940,043 on Mar. 9, 2021) by JMJ Holdings, LLC, titled "SOUND ATTENUATION APPARATUS AND METHOD";
- U.S. patent application Ser. No. 17/195,584, filed Mar. 8, 2021 by JMJ Holdings, LLC, titled "SOUND-ATTENUATION SYSTEM" (which issued as U.S. Pat. No. 11,179,273 on Nov. 23, 2021);
- PCT Patent Application No. PCT/US2020/066494, filed Dec. 21, 2020 by JMJ Holdings, LLC, titled "APPARATUS AND METHOD FOR AN EARPIECE-FOAM SHAPING/SIZING TOOL AND CONTAINER" (published as WO 2021/133747);
- U.S. Design patent application Ser. No. 29/718,377, filed Dec. 23, 2019 by JMJ Holdings, LLC, titled "EARPIECE-FOAM SIZING TOOL"; and
- U.S. Design patent application Ser. No. 29/769,169, filed Feb. 3, 2021 by JMJ Holdings, LLC, titled "EARPIECE DEVICE";

each of which is incorporated herein by reference in its entirety.

FIELD OF THE INVENTION

The present invention relates to devices and methods for earpiece systems, and in particular to a pliable stem for an earpiece and an earpiece incorporating the stem, wherein the stem includes a convex curved sound-attenuating distal flange and an attachment portion configured to receive and retain a foam sound-attenuating element in a spaced-apart relation interior to the inner surface of the curved sound-attenuating distal flange, the attachment portion extending substantially along an attachment axis, and a handle portion extending from the attachment portion substantially along a handle axis, wherein the sound-attenuating stem and the foam sound-attenuating element together are configured to fit into, and conform to the inner surface of, the user's ear canal with improved comfort and flexibility and with improved sound-attenuation properties. Some embodiments include a sound-conducting stem channel extending lengthwise through the stem. Some embodiments further include a coverable sound filter configured to insert into the sound-conducting channel in the handle portion, the sound filter including a lengthwise filter channel open to the stem channel, and a cover that is selectably movable to either occlude the filter channel or to open the filter channel to external sounds.

BACKGROUND OF THE INVENTION

U.S. Pat. No. 7,236,605 by Robert J. Oliveira et al. issued on Jun. 26, 2007 with the title "User disposable sleeve for use within the ear canal", and is incorporated herein by reference.

U.S. Pat. No. 7,743,771 by Robert N. Falco issued on Jun. 29, 2010 with the title "Earplug with articulating stem and locking features", and is incorporated herein by reference.

U.S. Pat. No. 8,161,975 by Crest Turdijian issued on Apr. 24, 2012 with the title "Dual mode impulse noise protecting earplug (D-182)", and is incorporated herein by reference.

U.S. Pat. No. 8,327,973 by William Parish et al. issued on Dec. 11, 2012 with the title "Foam compositions with enhanced sound attenuation", and is incorporated herein by reference.

U.S. Pat. No. 8,596,279 by Robert N. Falco issued on Dec. 3, 2013 with the title "Offset stem for earplug and earplug formed therewith", and is incorporated herein by reference. This patent describes a stem for an earplug and an earplug incorporating the stem where the stem includes an attachment portion configured to receive and retain a sound attenuating element, the attachment portion extending substantially along an attachment axis, and a handle portion extending from the attachment portion substantially along a handle axis, where at least part of the handle axis is non-collinear with respect to the attachment axis.

U.S. Pat. No. 10,440,459 by Richard C. Smith et al. issued on Oct. 8, 2019 with the title "Ergonomic earpiece", and is incorporated herein by reference.

There remains a need for an improved earpiece system.

SUMMARY OF THE INVENTION

As used herein, "proximal" means an end or surface closest to an exterior end of a device or element or earpiece, while "distal" means an end or surface closest to the end of a device or element that will be located furthest into a user's car canal and closest to the user's eardrum.

In some embodiments (as described below), the present invention provides an apparatus that includes a single-piece pliable earpiece stem having: a handle portion having an exterior shape with a maximum diameter, a length, a proximal end and a distal end; a proximal flange located at the distal end of the handle portion, wherein the proximal flange has an outward-facing proximal surface and an inward-facing distal surface; an attachment portion having an exterior shape with a maximum diameter, a length, a proximal end and a distal end; a tapered stop located at the distal end of the handle portion, the tapered stop having a proximal surface extending radially outward at a proximal end of the tapered stop, a maximum diameter near the proximal end of the tapered stop and a minimum diameter near a distal end of the tapered stop; and a curved distal flange located at the distal end of the tapered stop, wherein the curved distal flange has a convex external surface and a concave internal surface, and wherein the tapered stop is located completely within the curved distal flange.

In some embodiments (as described below), the present invention provides a method that includes: forming a single-piece pliable earpiece stem that includes: a handle portion having an exterior shape with a maximum diameter, a length, a proximal end and a distal end; a proximal flange located at the distal end of the handle portion, wherein the proximal flange has an outer-facing proximal surface and an inner-facing distal surface; an attachment portion having an exterior shape with a maximum diameter, a length, a proximal end and a distal end; a tapered stop located at the distal end of the handle portion, the tapered stop having a proximal surface extending radially outward at a proximal end of the tapered stop, a maximum diameter near the proximal end of the tapered stop and a minimum diameter near a distal end of the tapered stop; and a curved distal flange located at the distal end of the tapered stop, wherein the curved distal flange has a convex external surface and a concave internal surface, and wherein the tapered stop is located completely within the curved distal flange. Some embodiments of the apparatus further include: a single-piece visco-clastic foam sound-attenuating element positioned on the earpiece stem to surround the attachment portion between the proximal flange and the proximal surface of the tapered stop, wherein the foam sound-attenuating element has a proximal flange having a flange diameter that is larger than a largest diameter of the proximal flange, a middle portion having a middle-portion diameter that is smaller than the flange diameter of the tapered stop, and a distal portion having a distal-portion diameter of the tapered stop that is smaller than the middle-portion diameter and sized to be in a spaced-apart relation to the concave internal surface of the curved sound-attenuating distal flange of the pliable earpiece stem, wherein the visco-clastic foam sound-attenuating element has a length between a flat proximal surface of the proximal flange and a distal end surface of the distal portion, wherein the length of the visco-elastic foam sound-attenuating element is longer than a spacing between the outer proximal surface and the inner distal surface of the pliable earpiece stem, wherein the visco-elastic foam sound-attenuating element takes at least thirty (30) seconds to return to a default uncompressed exterior shape after being released from a compressed shape, and wherein the pliable earpiece stem is made of a material having a durometer of about 35 Shore A. In some embodiments of the apparatus, the visco-elastic foam sound-attenuating element is affixed to the attachment portion of the earpiece stem with an adhesive. In other embodiments, the visco-elastic foam sound-attenuating element is temporarily stretched, slid over an end of the pliable earpiece stem, and then released to its desired position on the attachment portion of the earpiece stem.

In some embodiments (as described below), the present invention provides a sound-attenuation system that includes: a visco-clastic foam sound-attenuating element having an interior channel; and a single-piece pliable earpiece stem that includes: a curved sound-attenuating distal flange, a tapered stop portion that is connected to the distal flange, an attachment portion that is attached to the tapered stop portion, a proximal flange that is attached to the attachment portion, and a handle portion that is attached to the proximal flange, wherein the distal flange has a convex external surface and a concave interior surface, wherein the tapered stop portion has an exterior surface located within, and spaced apart from, the concave interior surface of the distal flange, wherein the attachment portion has an exterior surface having a maximum diameter, wherein the interior channel of the visco-clastic foam sound-attenuating element has a default interior channel diameter that is smaller than the exterior diameter of the attachment portion, wherein the visco-clastic foam sound-attenuating element is stretched and placed on the single-piece pliable stem such that the interior channel of the visco-clastic foam sound-attenuating element conforms to the exterior surface of the attachment portion, wherein the visco-elastic foam sound-attenuating element takes at least five (5) seconds to return to a default uncompressed exterior shape after being released from a compressed shape, and wherein sound-attenuating stem and the foam sound-attenuating element together are configured to fit into a human user's car.

In some embodiments (as described below), the present invention provides a sound-attenuation system that includes a stem having a curved distal flange at a sound-emission end, a first channel portion that extends through the sound-emission end of the stem and a second channel portion through a handle at a sound receiver end of the stem, wherein the first channel portion has a first longitudinal axis, wherein the second channel portion has a second longitudinal axis, and wherein the first longitudinal axis is at a first angle to the second longitudinal axis (in some embodiments, the first angle is 180 degrees (straight through colinear axes), while in other embodiments, the first angle is between 100 degrees and 170 degrees; for example, about 135 degrees); a visco-clastic foam sound-attenuation plug positioned on the stem between the sound-emission end and the sound-receiver end; and an optional receiver-end component (such as a filter insert or a sound-communications device) configured to insert into the second channel portion of the stem. In some embodiments, a capped filter insert in the stem provides the user with a device that the user can use to push the assembled earpiece to a fully inserted position within the user's car canal.

In some embodiments, the visco-elastic foam sound-attenuating element is configured to be easily rolled between the user's thumb and finger(s) to a compressed shape (for example, in some embodiments, to a diameter that is less than 50% of the non-compressed shape) for easier insertion and positioning in the user's car canal, and the visco-clastic foam remains in to compressed shape for plenty of time to insert and position in the car canal and then the visco-clastic foam slowly and gently expands to conform the inner surface of the user's car canal. In addition, the visco-elastic foam is useful for absorbing and attenuating sound transmission through the foam portion as well as absorbing and attenuating sound transmission through the stem within the foam portion. In some embodiments, the visco-elastic foam sound-attenuating element takes at least sixty (60) seconds to return to a default uncompressed exterior shape after being released from a compressed shape. In some embodiments, the visco-elastic foam sound-attenuating element takes at least forty-five (45) seconds to return to a default uncompressed exterior shape after being released from a compressed shape. In some embodiments, the visco-elastic foam sound-attenuating element takes at least thirty (30) seconds to return to a default uncompressed exterior shape after being released from a compressed shape. In some embodiments, the visco-elastic foam sound-attenuating element takes at least fifteen (15) seconds to return to a default uncompressed exterior shape after being released from a compressed shape.

DETAILED DESCRIPTION OF THE INVENTION

Although the following detailed description contains many specifics for the purpose of illustration, a person of ordinary skill in the art will appreciate that many variations and alterations to the following details are within the scope of the invention. Specific examples are used to illustrate particular embodiments; however, the invention described in the claims is not intended to be limited to only these examples, but rather includes the full scope of the attached claims. Accordingly, the following preferred embodiments of the invention are set forth without any loss of generality to, and without imposing limitations upon the claimed invention. Further, in the following detailed description of the preferred embodiments, reference is made to the accompanying drawings that form a part hereof, and in which are shown by way of illustration specific embodiments in which the invention may be practiced. It is understood that other embodiments may be utilized and structural changes may be made without departing from the scope of the present invention.

It is specifically contemplated that the present invention includes embodiments having combinations and subcombinations of the various embodiments and features that are individually described herein (i.e., rather than listing every combinatorial of the elements, this specification includes descriptions of representative embodiments and contemplates embodiments that include some of the features from one embodiment combined with some of the features of another embodiment, including embodiments that include some of the features from one embodiment combined with some of the features of embodiments described in the patents and application publications incorporated by reference in the present application). Further, some embodiments include fewer than all the components described as part of any one of the embodiments described herein.

The leading digit(s) of reference numbers appearing in the Figures generally corresponds to the Figure number in which that component is first introduced, such that the same reference number is used throughout to refer to an identical component which appears in multiple Figures. Signals and connections may be referred to by the same reference number or label, and the actual meaning will be clear from its use in the context of the description.

Certain marks referenced herein may be common-law or registered trademarks of third parties affiliated or unaffiliated with the applicant or the assignee. Use of these marks is for providing an enabling disclosure by way of example and shall not be construed to limit the scope of the claimed subject matter to material associated with such marks.

Figure 1:
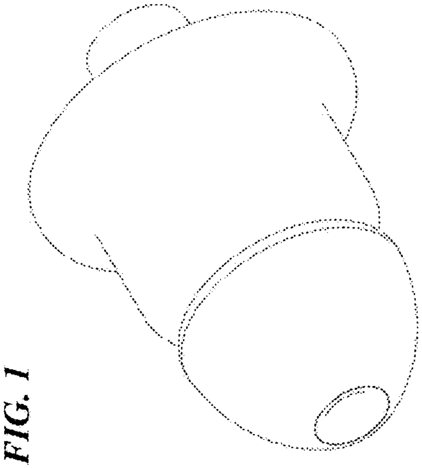
FIG. 1 is a perspective view of an earpiece apparatus, according to some embodiments of the present invention.

FIG. 1 is a perspective view of an earpiece apparatus, according to some embodiments of the present invention. In some embodiments, this earpiece apparatus is the same as 1701 described below for FIG. 17A and FIG. 20.

Figure 2:
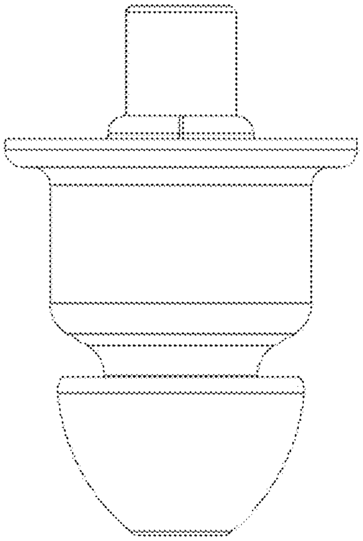
FIG. 2 is a left-side view of the earpiece apparatus, according to some embodiments of the present invention.

FIG. 2 is a left-side view of the earpiece apparatus, according to some embodiments of the present invention.

Figure 3:
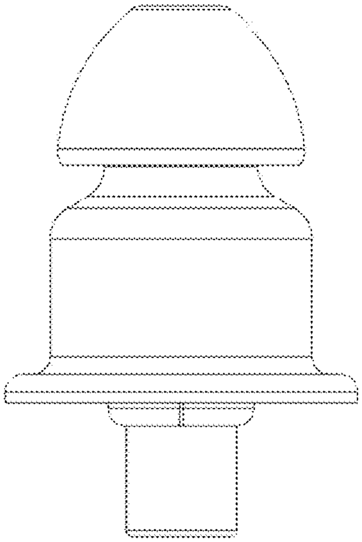
FIG. 3 is a right-side view of the earpiece apparatus, according to some embodiments of the present invention.

FIG. 3 is a right-side view of the earpiece apparatus, according to some embodiments of the present invention.

Figure 4:
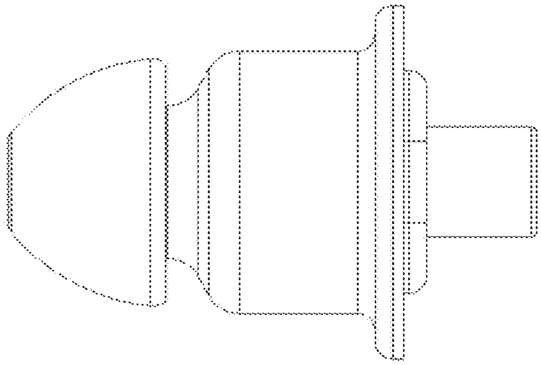
FIG. 4 is a front view of the earpiece apparatus, according to some embodiments of the present invention.

FIG. 4 is a front view of the earpiece apparatus, according to some embodiments of the present invention.

Figure 5:
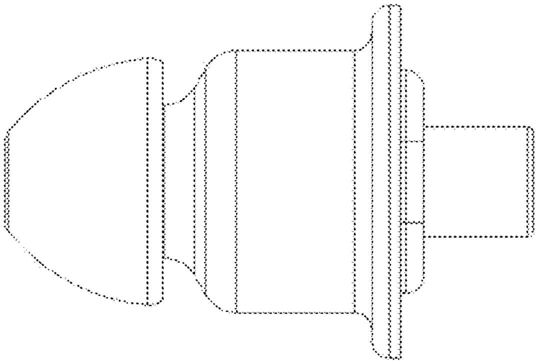
FIG. 5 is a back view of the earpiece apparatus, according to some embodiments of the present invention.

FIG. 5 is a back view of the earpiece apparatus, according to some embodiments of the present invention.

Figure 6:
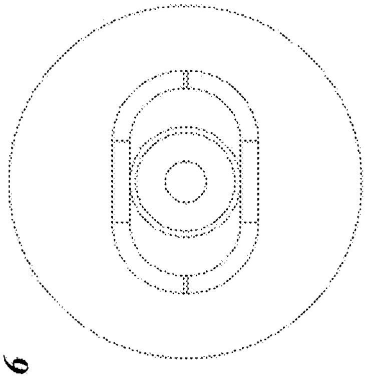
FIG. 6 is a top view of the earpiece apparatus (a view of the end of the apparatus not inserted into the ear), according to some embodiments of the present invention.

FIG. 6 is a top view of the earpiece apparatus, according to some embodiments of the present invention.

Figure 7:
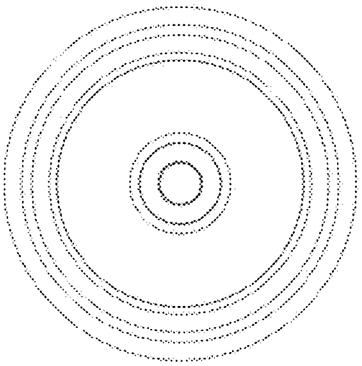
FIG. 7 is a bottom view of the earpiece apparatus (a view of the end of the apparatus inserted into the ear), according to some embodiments of the present invention.

FIG. 7 is a bottom view of the earpiece apparatus, according to some embodiments of the present invention.

Figure 8:
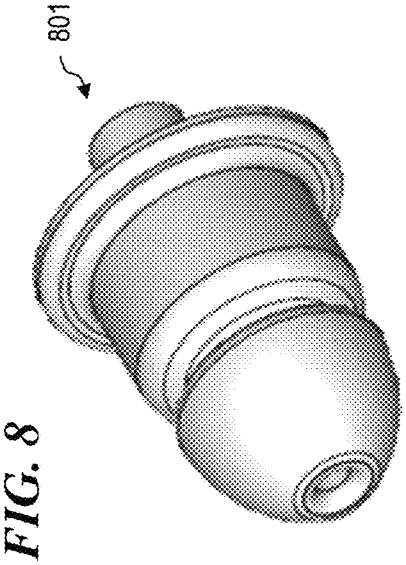
FIG. 8 is a perspective view of the earpiece apparatus, according to some embodiments of the present invention.

FIG. 8 is a perspective view of an earpiece apparatus assembly, according to some embodiments of the present invention.

Figure 9:
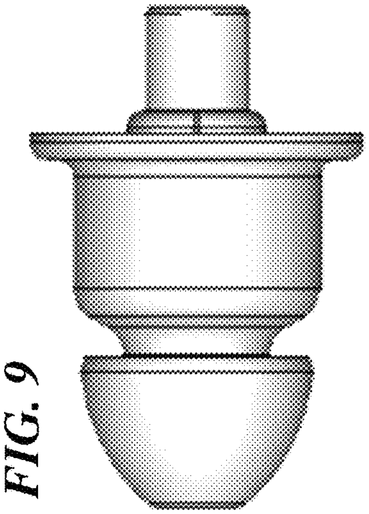
FIG. 9 is a left-side view of the earpiece apparatus, according to some embodiments of the present invention.

FIG. 9 is a left-side view of the earpiece apparatus assembly, according to some embodiments of the present invention.

Figure 10:
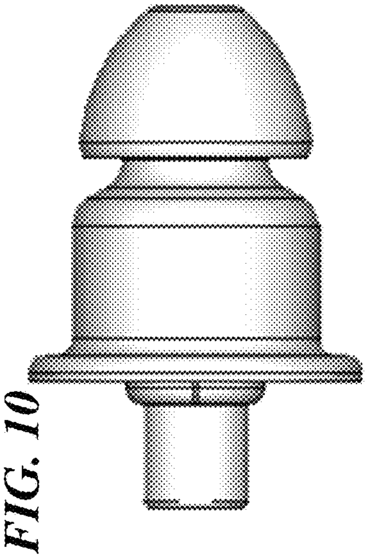
FIG. 10 is a right-side view of the earpiece apparatus, according to some embodiments of the present invention.

FIG. 10 is a right-side view of the earpiece apparatus assembly, according to some embodiments of the present invention.

Figure 11:
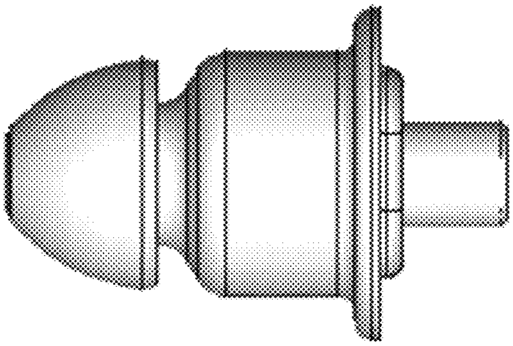
FIG. 11 is a front view of the earpiece apparatus, according to some embodiments of the present invention.

FIG. 11 is a front view of the earpiece apparatus assembly, according to some embodiments of the present invention.

Figure 12:
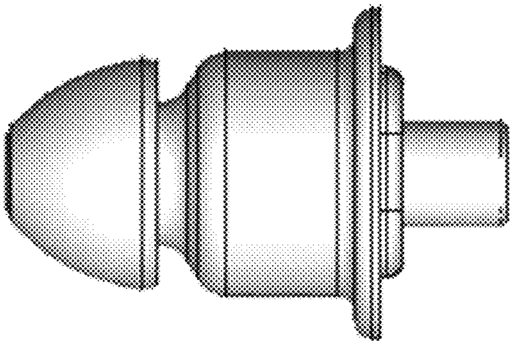
FIG. 12 is a back view of the earpiece apparatus, according to some embodiments of the present invention.

FIG. 12 is a back view of the earpiece apparatus assembly, according to some embodiments of the present invention.

Figure 13:
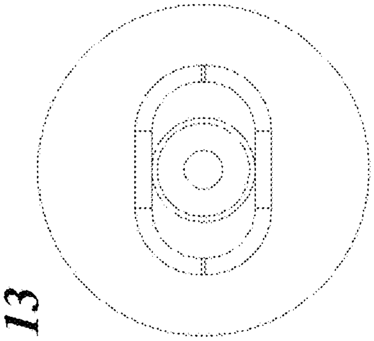
FIG. 13 is a top view of the earpiece apparatus, according to some embodiments of the present invention.

FIG. 13 is a top view of the earpiece apparatus assembly, according to some embodiments of the present invention.

Figure 14:
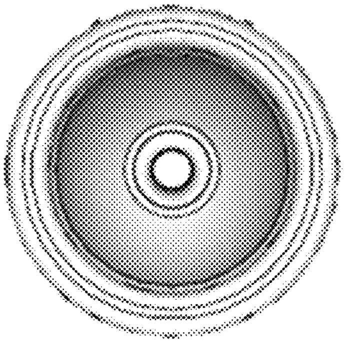
FIG. 14 is a bottom view of the earpiece apparatus, according to some embodiments of the present invention.

FIG. 14 is a bottom view of the earpiece apparatus assembly, according to some embodiments of the present invention.

Figures 15A, 15B, 15C, 16:
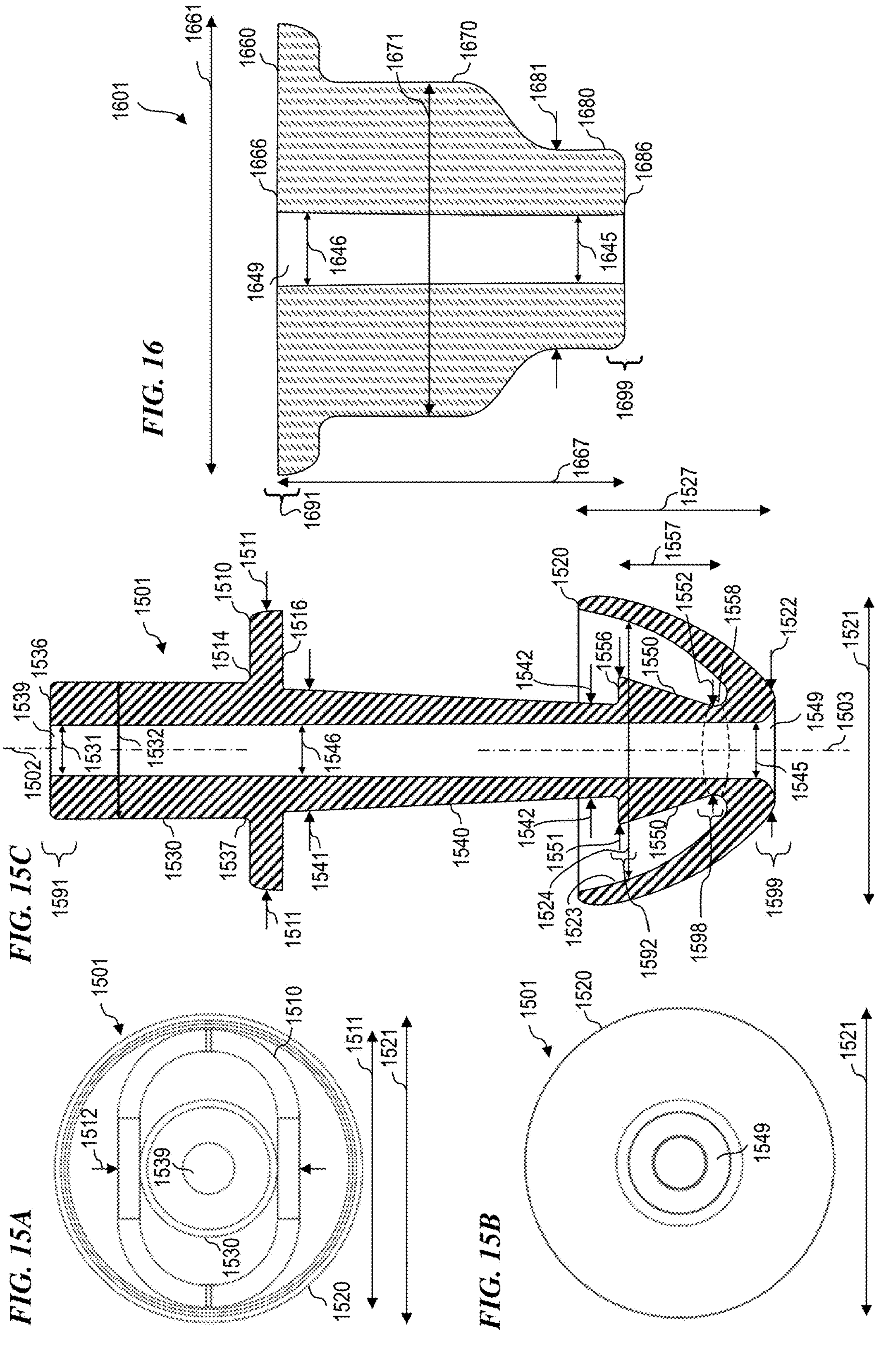
FIG. 15A is a top view of a pliable earpiece sound-attenuating stem 1501, according to some embodiments of the present invention.
FIG. 15B is a bottom view of pliable earpiece sound-attenuating stem 1501, according to some embodiments of the present invention.
FIG. 15C is a cross-sectional side view of a pliable earpiece sound-attenuating stem 1501, according to some embodiments of the present invention.
FIG. 16 is a cross-sectional side view of a foam sound-attenuating element 1601, according to some embodiments of the present invention.

FIG. 15A is a top view of a pliable earpiece sound-attenuating stem 1501, according to some embodiments of the present invention. In some embodiments, pliable sound-attenuating stem 1501 includes a proximal (external to the ear canal) flange 1510, a curved convex hollow distal (internal to the ear canal) sound-attenuating pliable distal flange 1520, and a handle portion 1530. In some embodiments, the proximal (external) flange 1510 has an oval or truncated-circular external circumference, such that diameter 1511 is larger across one direction than diameter 1512 in a perpendicular direction, in order to provide more comfortable and/or easier positioning of the resulting assembled earpiece (e.g., assembled earpiece 1701 of FIG. 17) within the ear canal of the human user. In some embodiments, this rotational positioning is adjustable by the user manually rotating handle 1530, or an attachment that is inserted into channel 1539 of handle 1530, such as a filter stem having a cap that can be opened or closed, or a sound-communications insert or other insert (as described below).

FIG. 15B is a bottom view of pliable earpiece sound-attenuating stem 1501, showing the perimeter of sound-attenuating pliable distal flange 1520 and the internal (inside-the-ear) opening of interior channel 1549. In some embodiments, interior channel 1549 tapers from a largest diameter 1545 at the distal end (see FIG. 15C) to a smaller diameter 1531 at the proximal end of channel 1549 or channel 1539).

FIG. 15C is a cross-sectional side view of a pliable earpiece sound-attenuating stem 1501, according to some embodiments of the present invention. In some embodiments, pliable sound-attenuating stem 1501 (also called pliable base 1501) has a receiver end 1591 and an emitter end 1599, and includes tapered portion 1550 (also called stop section 1550) that has a receiver end 1592 and an emitter end 1598 of stop section 1550. In some embodiments, pliable sound-attenuating stem 1501 includes a proximal (external to the ear canal) flange 1510 (having an outer/proximal surface 1514, and a substantially flat interior/distal surface 1516), curved convex hollow distal (internal to the ear canal) sound-attenuating pliable flange 1520, handle portion 1530 that includes an exterior shape with a maximum diameter 1532, a length, a proximal end 1536, and a distal end 1537, an attachment portion 1540 configured to receive and retain a foam sound-attenuating element 1601 (see FIG. 16) having a narrowed end portion (having external diameter 1542) in a spaced-apart relation to, and within a surrounding portion of, curved sound-attenuating distal flange 1520, and a tapered portion 1550 having a flat surface 1556 that faces toward flat interior surface 1516 of flange 1510. In some embodiments, curved sound-attenuating distal flange 1520 has a convex circularly symmetric shape with a maximum diameter 1521 that tapers along a convex curve to a smaller distal-end diameter 1522 and has a length 1527. In some embodiments, the inner surface 1523 of the distal flange 1520 is sized to be in a default spaced apart relation to the outer surface of the external lateral surface of tapered portion 1550, and in some embodiments, that spacing distance between the proximal (widest) end of tapered portion 1550 and the inner surface 1523 of distal flange 1520 is approximately 0.37 times the maximum diameter 1551 of the external lateral surface of tapered portion 1550, and the diameter 1524 of the inner surface 1523 at that position is approximately 1.8 times the maximum diameter 1551 of the external lateral surface of tapered portion 1550. Since distal flange 1520 is attached to the distal end of tapered portion 1550 at a flexible joint region 1558, distal flange 1520 may bend such that the inner surface 1523 is much nearer to, or touching, tapered portion 1550 or nearer to, or touching, foam sound-attenuating element 1601 in the assembled earpiece 1701 (see FIG. 16 and FIG. 17B described below). In some embodiments, the external lateral surface of tapered portion 1550 is shaped like the frustrum of a cone. In some embodiments, tapered portion 1550 is shaped to vary its stiffness from a more-stiff stiffness value at its proximal end (having a larger proximal external diameter 1551) to a less-stiff stiffness value at its distal end (having a distal external diameter 1552, wherein the proximal external diameter 1551 is larger than distal external diameter 1552), in order to reduce a tendency of tapered portion 1550 to collapse or bend sideways along its length 1557, yet still allow easier bending of the distal flange 1520 relative to tapered portion 1550 at bending location 1558 at the distal end of tapered portion 1550 to allow a variable angle (as shown in FIG. 17B) of the pliable distal flange 1520 relative to the internal-to-the-ear stem axis 1503.

In some embodiments, handle portion 1530 includes a handle channel 1539 that extends lengthwise and is continuous with, and open to, stem interior channel 1549 that extends lengthwise through attachment portion 1540, tapered portion 1550 and pliable distal flange 1520. In some embodiments (not in the embodiment shown in FIG. 15C), stem interior channel 1549 is tapered from a larger interior diameter 1545 at its distal end to a smaller in-between diameter 1546 located closer to where stem interior channel 1549 joins to handle channel 1539. In some such embodiments, handle channel 1539 continues to reduce in diameter to a proximal diameter 1531 that is smaller than in-between diameter 1546. In this way, some embodiments provide a horn-shaped or continuously tapered interior channel that includes handle channel 1539 and stem interior channel 1549, and whose continuously tapered interior diameter is largest near the distal end (inside-the-car end) of interior channel 1549 and smallest near the proximal end (outside-the-car end) of handle channel 1539, and wherein the handle-channel axis 1502 is colinear (along the same straight line) with stem interior-channel axis 1503.

In some embodiments, attachment portion 1540 has a constant outer diameter along its length such that proximal external diameter 1541 is equal to distal external diameter 1542. In some such embodiments, interior channel 1549 has a constant interior diameter, while other such embodiments, which are more preferred for some uses, include a tapered (horn-shaped) interior channel 1549 that is wider at its distal end (inside-the-car end) than at its proximal end (outside-the-car end). In still other embodiments, interior channels 1539 and 1549 together form an overall channel that tapers from a largest diameter at its proximal end (outside-the-car end) and smallest near its distal end (inside-the-car end).

In other embodiments, attachment portion 1540 has a tapered outer diameter along its length such that proximal external diameter 1541 is larger than distal external diameter 1542. In some such embodiments, where attachment portion 1540 is tapered along its length such that proximal external diameter 1541 is larger than distal external diameter 1542, and wherein the opposite taper direction of the interior channel 1549, the resulting stem is more flexible at its distal end than at its proximal end.

In some embodiments, pliable earpiece sound-attenuating stem 1501 is very soft and flexible (for example, in some embodiments, stem 1501 has a durometer of 35 Shore A, and in other embodiments, of between about 30 Shore A and about 30 Shore A, inclusive, or of between about 25 Shore A and about 45 Shore A, inclusive, or of between about 30 Shore A and about 50 Shore A, inclusive, or of between about 30 Shore A and about 60 Shore A, inclusive) such that it will easily bend in order to avoid user discomfort when the earpiece system 1501 is in place in the car and the user wears a helmet or other head covering that covers the user's car. In some embodiments, foam sound-attenuating element 1601 (described below) provides both support (to keep attachment portion 1540 of stem 1501 from buckling) and, in some embodiments, is made of a visco-elastic material to provide a sound-dampening function along the length of attachment portion 1540 of stem 1501.

In other embodiments (not shown), there are no air channels through pliable stem 1501 (e.g., in some such embodiments, pliable stem 1501 and assembled earpiece 1701 (described below) provide a full block against sound and against changes in air pressure).

FIG. 16 is a cross-sectional side view of a foam sound-attenuating element 1601, according to some embodiments of the present invention. In some embodiments, foam sound-attenuating element 1601 is made of a visco-elastic foam (also called memory form) that, once temporarily compressed slowly restores (e.g., over a period of about 5 seconds to about 30 seconds) toward a default fully expanded shape or toward a shape that conforms gently to the shape of the user's ear canal. In some embodiments, foam sound-attenuating element 1601 (also called sound-attenuation plug 1601) includes an internal first channel 1649 that passes through an entire length of the sound-attenuation plug 1601 and that has a proximal-end inner diameter 1646 near the receiver end 1691 of sound-attenuating element 1601 and a distal end internal diameter 1645 near the emitter end 1691 of sound-attenuating element 1601. In some embodiments, foam sound-attenuating element 1601 includes external flange 1660 configured to seal against an external end perimeter of the ear canal of a user, a middle section 1670 configured to seal to the interior portion of the user's ear canal, and a smaller-diameter distal portion 1680 sized to fit inside the sound-attenuating pliable distal flange 1520 of stem 1501 spaced apart to be not touching (or mostly not touching) sound-attenuating pliable distal flange 1520. The visco-elastic foam of foam sound-attenuating element 1601 allows the user to roll the resulting assembled ear plug 1701 (see FIG. 17A), e.g., between thumb and forefinger, to a small diameter to facilitate easy insertion fully into the user's ear canal, such that ear plug 1701 slowly expands to conform to and seal to the user's ear canal. In some embodiments, a top flat surface 1666 of foam sound-attenuating element 1601 will compress against or be nearest to flat interior/distal surface 1516 of flange 1510, and a bottom flat surface 1686 of foam sound-attenuating element 1601 will compress against or be nearest to flat proximal surface 1556 of tapered (e.g., frustrum-shaped) section 1550.

Figure 17C:
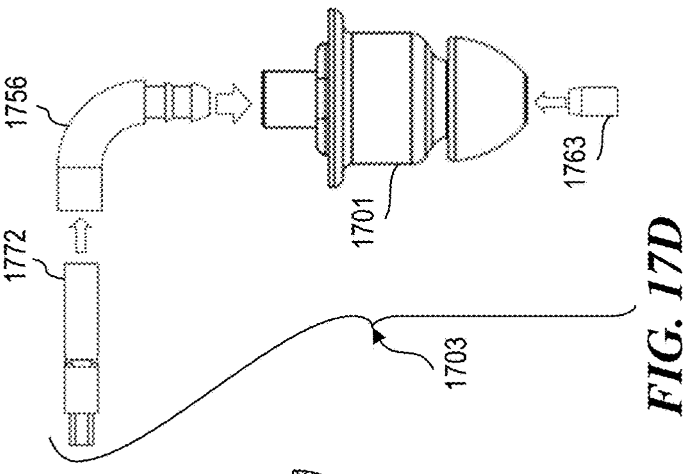
FIG. 17C is a side view of an assembly process 1703 showing assembled earpiece 1701 being assembled with additional inserts 1772, 1756 and 1763, according to some embodiments of the present invention.
Figure 17D:
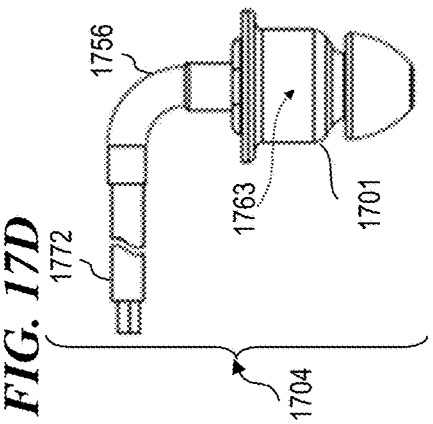
FIG. 17D is a side view of an assembled earpiece system 1704 including additional inserts 1756 and 1763 inserted into assembled earpiece 1701, according to some embodiments of the present invention.
Figure 17B:
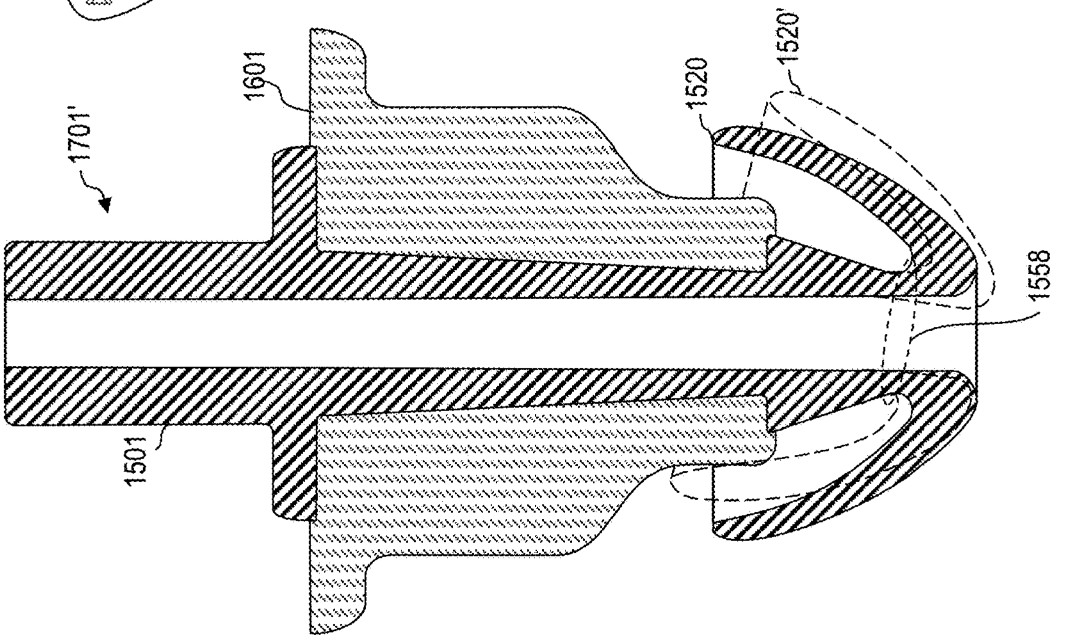
FIG. 17B is a cross-sectional side view of assembled earpiece 1701' showing sound-attenuating pliable distal flange in its default position labeled 1520, and in dashed-line outline of a bent position, labeled 1520'.
Figure 17A:
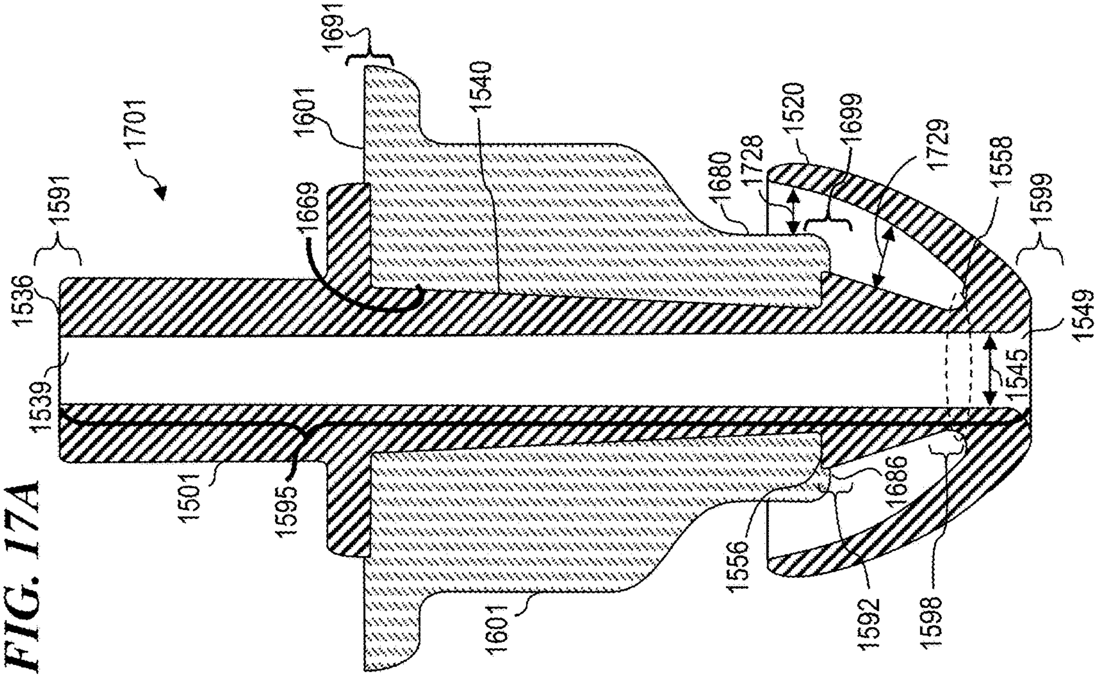
FIG. 17A is a cross-sectional side view of an assembled earpiece 1701 that includes pliable sound-attenuating stem 1501 and foam sound-attenuating element 1601, according to some embodiments of the present invention.

FIG. 17A is a cross-sectional side view of an assembled earpiece 1701 that includes pliable sound-attenuating stem 1501 (also called pliable base 1501) and foam sound-attenuating element 1601, according to some embodiments of the present invention. In some embodiments. pliable sound-attenuating stem 1501 has a receiver end 1591 and an emitter end 1599, and includes tapered portion 1550 (also called stop section 1550) that has a receiver end 1592 and an emitter end 1598 of stop section 1550. In some embodiments, earpiece 1701 is assembled by stretching and forcing foam sound-attenuating element 1601 over the end of pliable distal flange 1520 and into position around attachment portion 1540 of stem 1501, wherein top surface 1666 of foam sound-attenuating element 1601 is compressed against flat interior surface 1516 of flange 1510, and bottom flat surface 1686 of foam sound-attenuating element 1601 is compressed against flat proximal surface 1556 of tapered section 1550. In some embodiments, foam sound-attenuating element 1601 keeps the attachment portion 1540 of stem 1501 from buckling, and also absorbs and attenuates sound that otherwise is somewhat conducted through the length of stem 1501. The numerous material discontinuities and spacings between stem 1501 and foam sound-attenuating element 1601 also further help to attenuate sound. The bend axis is labeled 1588 and is located at the narrow (less stiff) end of tapered portion 1550 (see FIG. 15C). In various embodiments, optional inserts such as sound-filter inserts that further optionally include openable and closable covers, communications inserts, handle inserts, and the like (such as shown in FIGS. 55 through 82) are inserted into the handle channel 1539 and/or filter inserts may be positioned into the internal stem channel 1549. Together, handle channel 1539 and stem channel 1549 form a second channel 1595 that passes through an entire length of the pliable base 1501.

FIG. 17B is a cross-sectional side view of assembled earpiece 1701 (labeled here as 1701' because distal flange 1520 is also shown with dashed-line alternative bent position 1520') that includes pliable sound-attenuating stem 1501 and foam sound-attenuating element 1601. FIG. 17B shows sound-attenuating pliable distal flange in its default position labeled 1520, and in dashed-line outline of a bent position, labeled 1520'. The bend axis is labeled 1588 and is located at the narrow end of tapered portion 1550 (see FIG. 15C).

Figures 55, 56, 57, 58, 59, 60, 61:
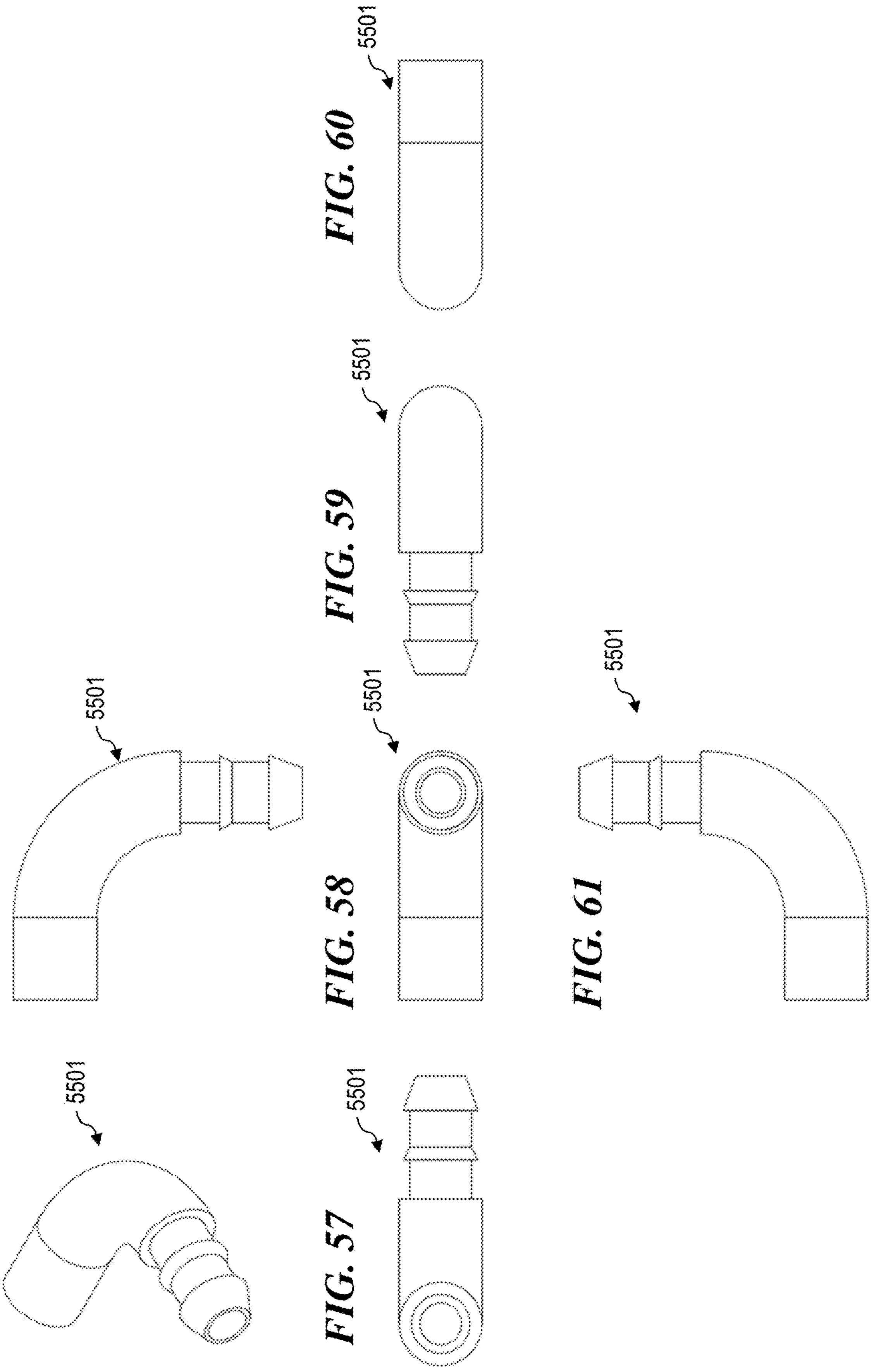
FIG. 55 is a perspective view of a curved communications insert 5501 having a barbed insertion shaft, according to some embodiments of the present invention.
FIG. 56 is a left-side view of curved communications insert 5501, according to some embodiments of the present invention.
FIG. 57 is an outside-end view of curved communications insert 5501, according to some embodiments of the present invention.
FIG. 58 is a back-end view of curved communications insert 5501, according to some embodiments of the present invention.
FIG. 59 is a view opposite to outside-end view of FIG. 57 of curved communications insert 5501, according to some embodiments of the present invention.
FIG. 60 is a view opposite to back-end view of FIG. 58 of curved communications insert 5501, according to some embodiments of the present invention.
FIG. 61 is a right-side view of curved communications insert 5501, according to some embodiments of the present invention.
Figures 69, 70, 71, 72, 73, 74, 75:
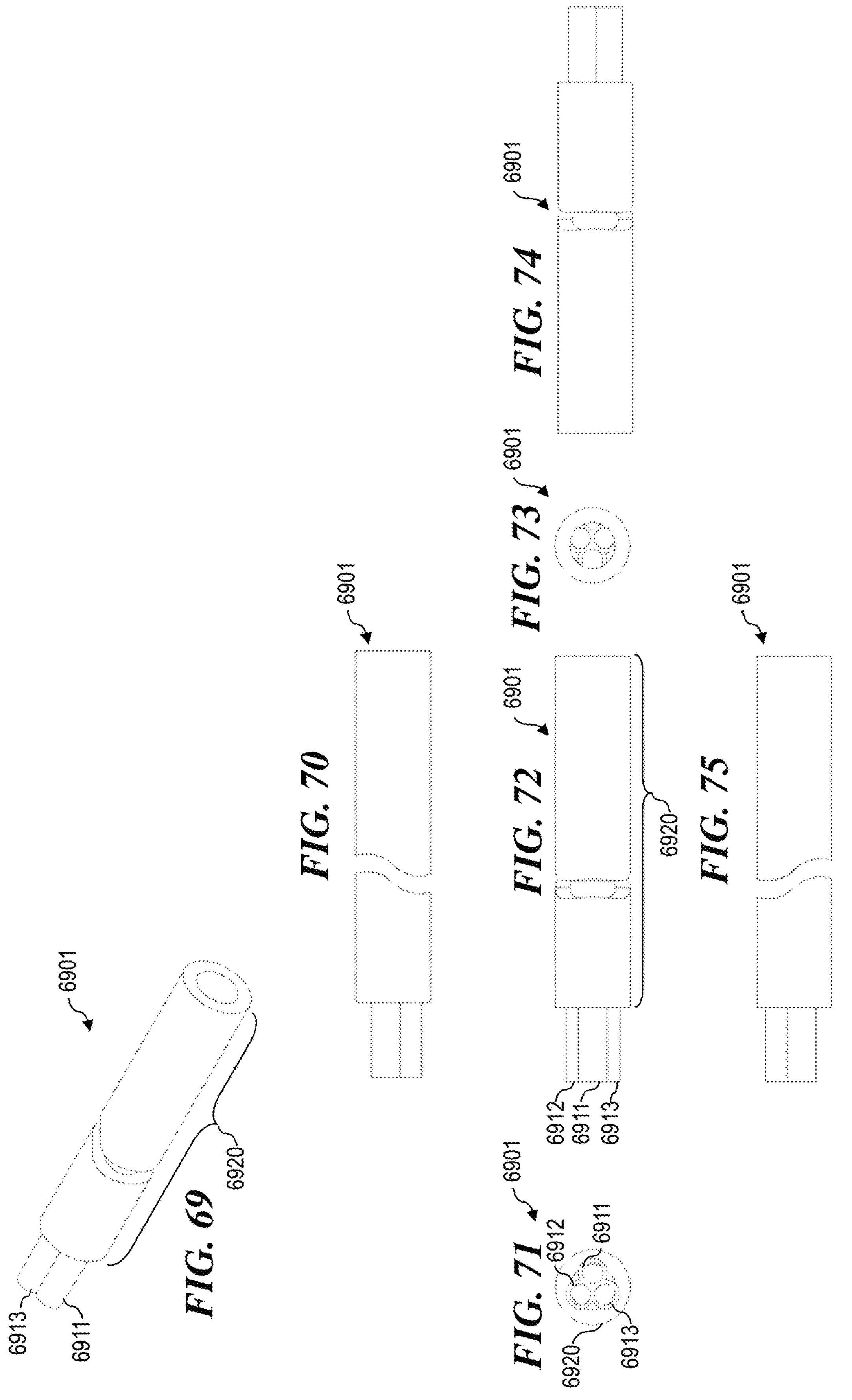
FIG. 69 is a perspective view of a straight communications insert 6901 having an un-barbed insertion shaft, according to some embodiments of the present invention.
FIG. 70 is a left-side view of straight communications insert 6901, according to some embodiments of the present invention.
FIG. 71 is an outside-end view of straight communications insert 6901, according to some embodiments of the present invention.
FIG. 72 is a back-end view of straight communications insert 6901, according to some embodiments of the present invention.
FIG. 73 is a view opposite to the outside-end view of FIG. 71 of straight communications insert 6901, according to some embodiments of the present invention.
FIG. 74 is a front-side view of straight communications insert 6901, according to some embodiments of the present invention.
FIG. 75 is a right-side view of straight communications insert 6901, according to some embodiments of the present invention.

FIG. 17C is a side view of an assembly process 1703 showing assembled earpiece 1701 being assembled with additional inserts 1772, 1756 and 1763, according to some embodiments of the present invention. In some embodiments, a communications insert 1772 (such as shown in FIG. 72), such as a Bluetooth® wireless earphone electronics, a hearing aid, or the like) is inserted into a protective elbow 1756 (such as shown in FIG. 56) having a barbed insertion shaft plug (as shown) or other suitable insertion plug having a central channel therethrough, wherein the insertion shaft plug is inserted into handle channel 1539. In other embodiments, communications insert 1772 is inserted directly into handle channel 1539 and elbow 1756 is omitted. In other embodiments, any other suitable insert (such as capped filter 3776 shown and described in FIG. 37C and similar to the sound filters described in U.S. Pat. No. 9,603,746, which was introduced above) is inserted into handle channel 1539. In some embodiments, an optional filter insert 1763 is inserted into channel 1549 from the distal end, or into or through channel 1539 from the proximal end before being followed by a successive insertion of elbow 1756 into channel 1539.

FIG. 17D is a side view of an assembled earpiece system 1704 including additional inserts 1756 and 1763 (which is not visible, after insertion) inserted into assembled earpiece 1701, according to some embodiments of the present invention. The dotted leader line from reference number 1763 indicates that filter 1763 is within channel 1549 and is not visible from this external view.

Figure 18:
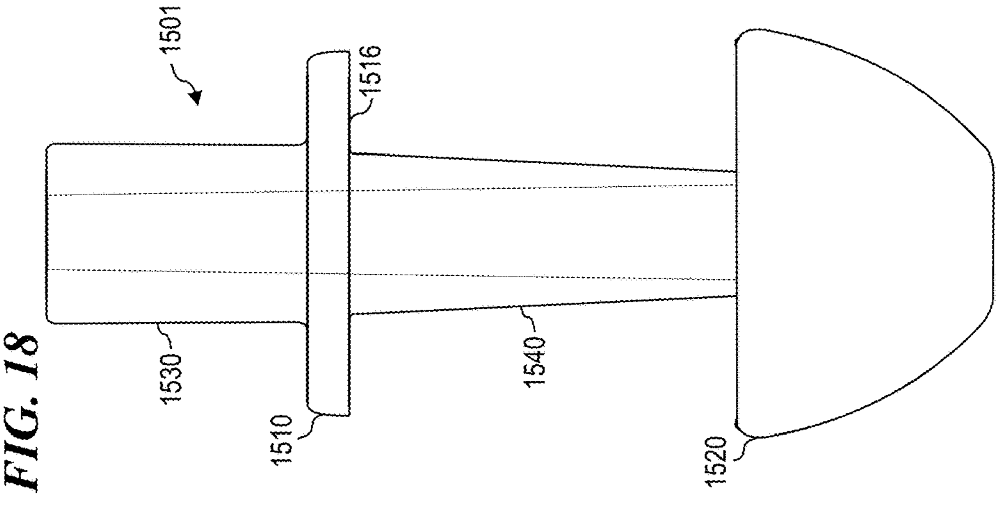
FIG. 18 is a side view of pliable earpiece sound-attenuating stem 1501, according to some embodiments of the present invention.

FIG. 18 is a side view of pliable earpiece sound-attenuating stem 1501, according to some embodiments of the present invention. The reference numbers are as described above for FIG. 15C.

Figure 19:
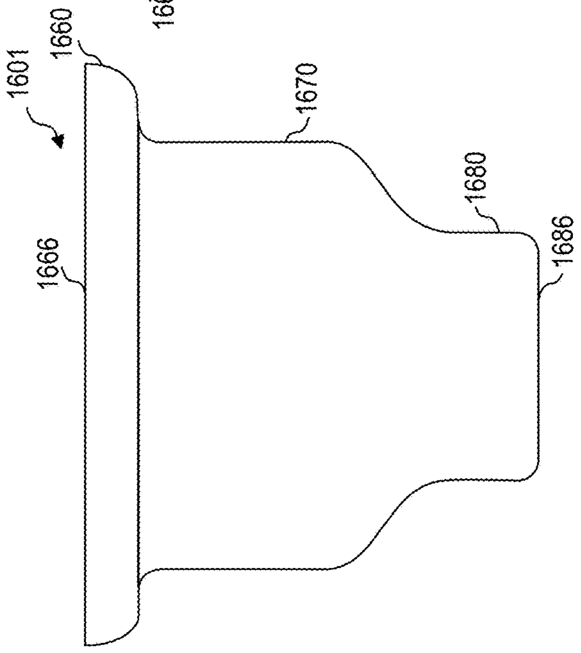
FIG. 19 is a side view of foam sound-attenuating element 1601, according to some embodiments of the present invention.

FIG. 19 is a side view of foam sound-attenuating element 1601, according to some embodiments of the present invention. The reference numbers are as described above for FIG. 16.

Figure 20:
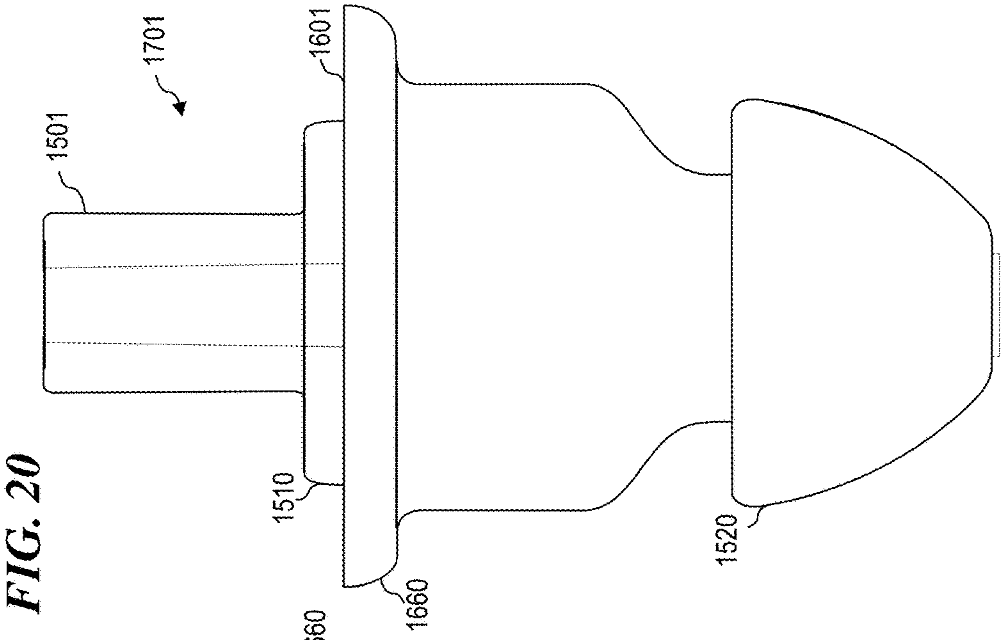
FIG. 20 is a side view of assembled earpiece 1701 that includes pliable sound-attenuating stem 1501 and foam sound-attenuating element 1601, according to some embodiments of the present invention.

FIG. 20 is a side view of assembled earpiece 1701 that includes pliable sound-attenuating stem 1501 and foam sound-attenuating element 1601, according to some embodiments of the present invention. The reference numbers are as described above for FIG. 17.

Figure 21:
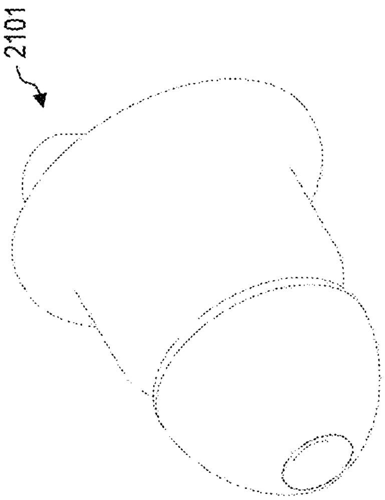
FIG. 21 is a perspective view of an angled-handle earpiece apparatus 2101, according to some embodiments of the present invention.

FIG. 21 is a perspective view of an angled-handle earpiece apparatus assembly 2101, according to some embodiments of the present invention.

Figure 22:
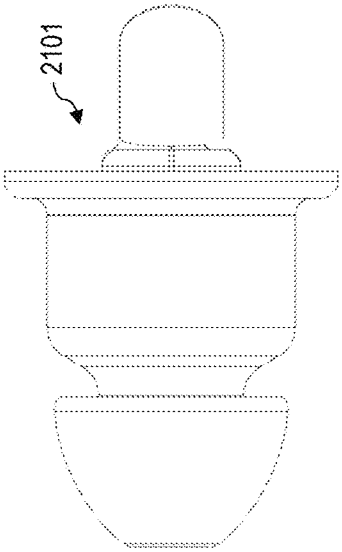
FIG. 22 is a left-side view of angled-handle earpiece apparatus 2101, according to some embodiments of the present invention.

FIG. 22 is a left-side view of angled-handle earpiece apparatus assembly 2101.

Figure 23:
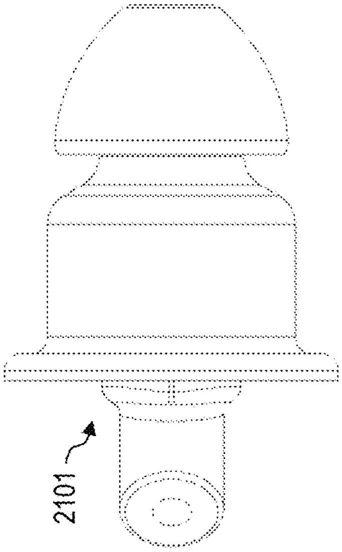
FIG. 23 is a right-side view of angled-handle earpiece apparatus 2101, according to some embodiments of the present invention.

FIG. 23 is a right-side view of angled-handle earpiece apparatus assembly 2101.

Figure 24:
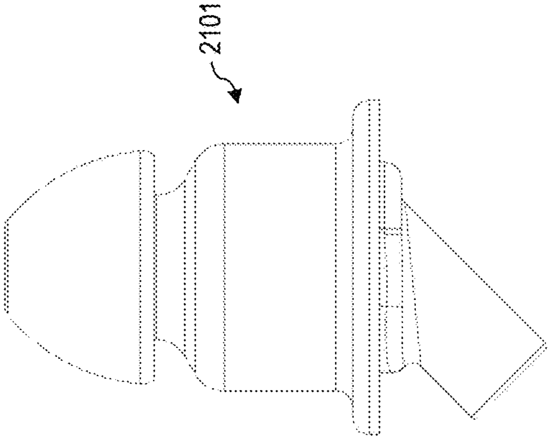
FIG. 24 is a front view of angled-handle earpiece apparatus 2101, according to some embodiments of the present invention.

FIG. 24 is a front view of angled-handle earpiece apparatus assembly 2101.

Figure 25:
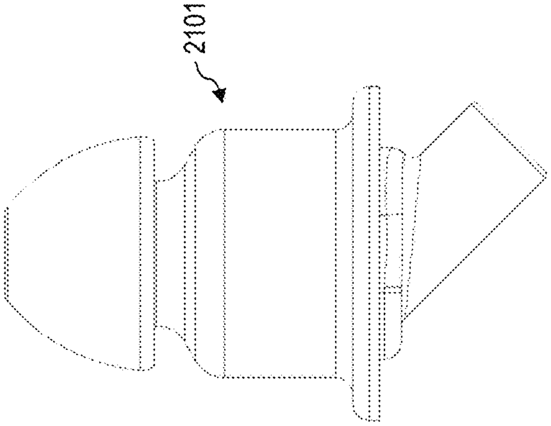
FIG. 25 is a back view of angled-handle earpiece apparatus 2101, according to some embodiments of the present invention.

FIG. 25 is a back view of angled-handle earpiece apparatus assembly 2101.

Figure 26:
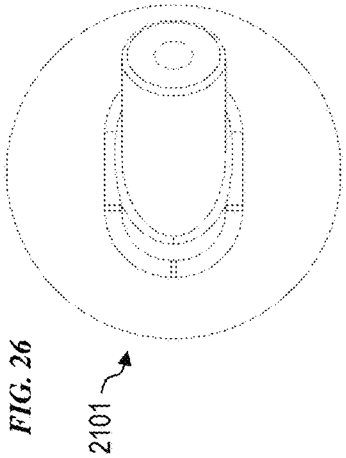
FIG. 26 is a top view of angled-handle earpiece apparatus 2101, according to some embodiments of the present invention.

FIG. 26 is a top view of angled-handle earpiece apparatus assembly 2101.

Figure 27:
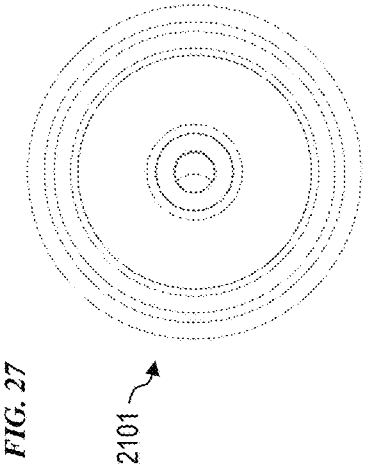
FIG. 27 is a bottom view of angled-handle earpiece apparatus 2101, according to some embodiments of the present invention.

FIG. 27 is a bottom view of angled-handle earpiece apparatus assembly 2101.

Figure 28:
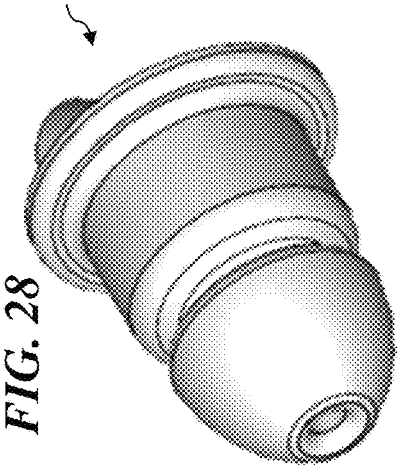
FIG. 28 is a perspective view of angled-handle apparatus assembly 2101, according to some embodiments of the present invention.

FIG. 28 is a perspective view of angled-handle apparatus assembly 2101.

Figure 29:
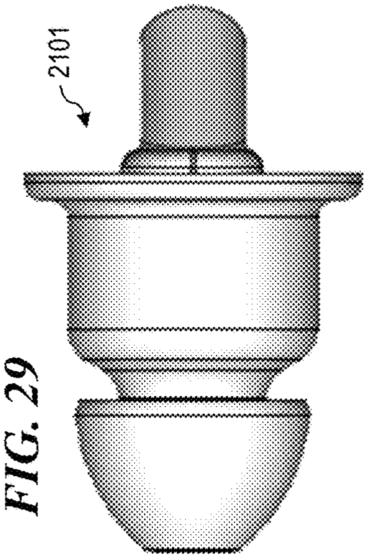
FIG. 29 is a left-side view of angled-handle earpiece apparatus assembly 2101, according to some embodiments of the present invention.

FIG. 29 is a left-side view of angled-handle earpiece apparatus assembly 2101.

Figure 30:
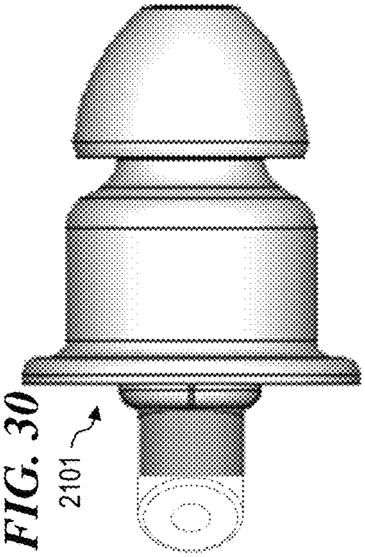
FIG. 30 is a right-side view of angled-handle earpiece apparatus assembly 2101, according to some embodiments of the present invention.

FIG. 30 is a right-side view of angled-handle earpiece apparatus assembly 2101.

Figure 31:
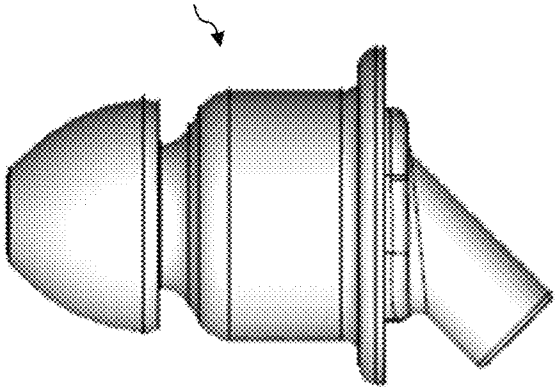
FIG. 31 is a front view of angled-handle earpiece apparatus assembly 2101, according to some embodiments of the present invention.

FIG. 31 is a front view of angled-handle earpiece apparatus assembly 2101.

Figure 32:
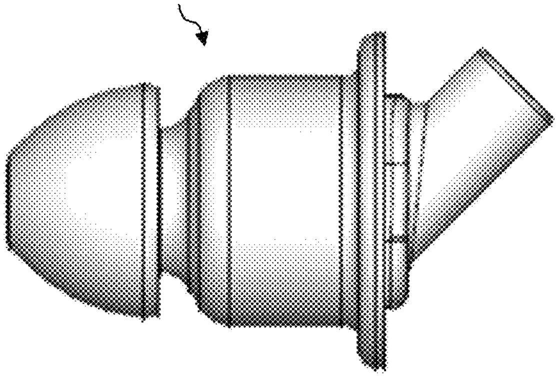
FIG. 32 is a back view of angled-handle earpiece apparatus assembly 2101, according to some embodiments of the present invention.

FIG. 32 is a back view of angled-handle earpiece apparatus assembly 2101.

Figure 33:
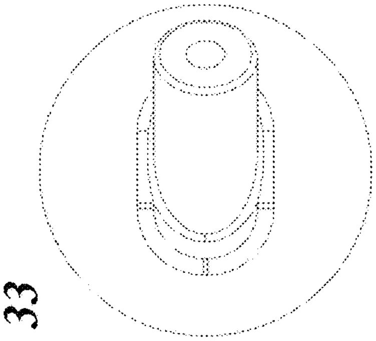
FIG. 33 is a top view of angled-handle earpiece apparatus assembly 2101 (a view of the end of the apparatus not inserted into the ear), according to some embodiments of the present invention.

FIG. 33 is a top view of angled-handle earpiece apparatus assembly 2101.

Figure 34:
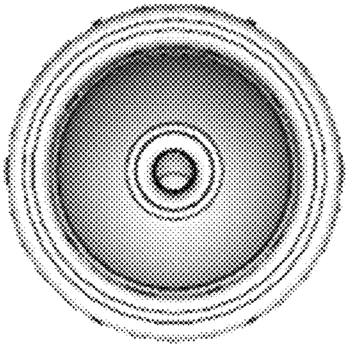
FIG. 34 is a bottom view of angled-handle earpiece apparatus assembly 2101 (a view of the end of the apparatus inserted into the ear), according to some embodiments of the present invention.

FIG. 34 is a bottom view of angled-handle earpiece apparatus assembly 2101.

Figure 35C:
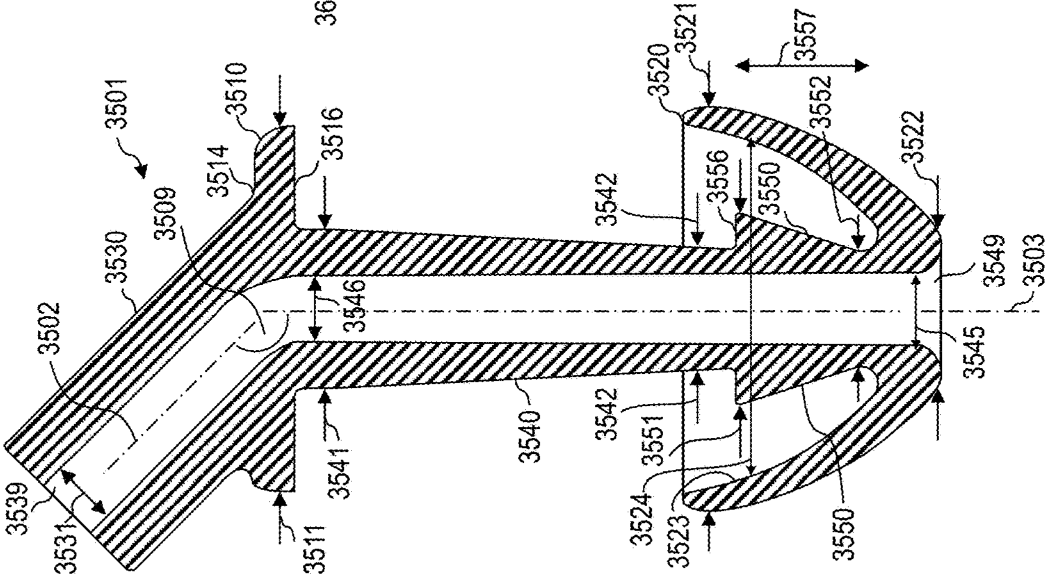
FIG. 35C is a cross-sectional side view of angled-handle pliable earpiece sound-attenuating stem 3501, according to some embodiments of the present invention.
Figure 35A:
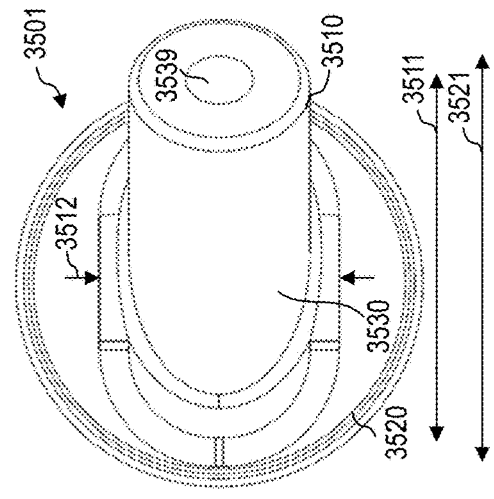
FIG. 35A is a top view of a pliable angled-handle earpiece sound-attenuating stem 3501, according to some embodiments of the present invention.

FIG. 35A is a top view of a pliable angled-handle earpiece sound-attenuating stem 3501, according to some embodiments of the present invention; description here of FIG. 35A includes references to elements shown in the cross-sectional side view of FIG. 35C. In some embodiments, the various parts of pliable angled-handle earpiece sound-attenuating stem 3501 are substantially similar in shape and function to pliable straight-handle earpiece sound-attenuating stem 1501, except that the angled-handle portion 3530 has a central axis 3502 (see FIG. 35C) that is bent at an angle 3509 to interior channel axis 3503. In some embodiments, pliable angled-handle sound-attenuating stem 3501 includes a proximal (external to the car canal) flange 3510, a curved convex hollow distal (internal to the car canal) sound-attenuating pliable distal flange 3520, and an angled-handle portion 3530. In some embodiments, curved sound-attenuating distal flange 3520 has a convex circularly symmetric shape with a maximum diameter 3521 that tapers along a convex curve to a smaller distal-end diameter 3522 (see FIG. 35C) and has a length 3525. In some embodiments, the inner surface 3523 of the distal flange 3520 is sized to be in a default spaced-apart relation to the outer surface of the external lateral surface of tapered portion 3550, and in some embodiments, that spacing distance between the proximal (widest) end of tapered portion 3550 and the inner surface 3523 of distal flange 3520 is approximately 0.37 times the maximum diameter 3551 of the external/proximal lateral surface of tapered portion 3550, and the diameter 3524 of the inner surface 3523, at the location shown, is approximately 1.8 times the maximum diameter 3551 of the external/proximal lateral surface of tapered portion 3550. Since distal flange 3520 is attached to the distal end of tapered portion 3550 at a flexible joint region 3558, distal flange 3520 may bend such that the inner surface 3523 is much nearer to, or touching, tapered portion 3550 or nearer to, or touching, foam sound-attenuating element 3601 in the assembled earpiece 3701 (see FIG. 36 and FIG. 37B described below). In some embodiments, the proximal (external) flange 3510 has an oval or truncated-circular external circumference, such that diameter 3511 is larger across one direction than diameter 3512 in a perpendicular direction, in order to provide more comfortable and/or easier positioning of the resulting assembled earpiece (e.g., assembled earpiece 3701 of FIG. 37) within the car canal of the human user. In some embodiments, this rotational positioning is adjustable by the user manually rotating handle 3530, or rotating an attachment that is inserted into channel 3539 of angled handle 3530, such as a filter stem having a cap that can be opened or closed, or an uncapped filter insert, or a sound-communications insert, or other insert (as described below).

Figure 35B:
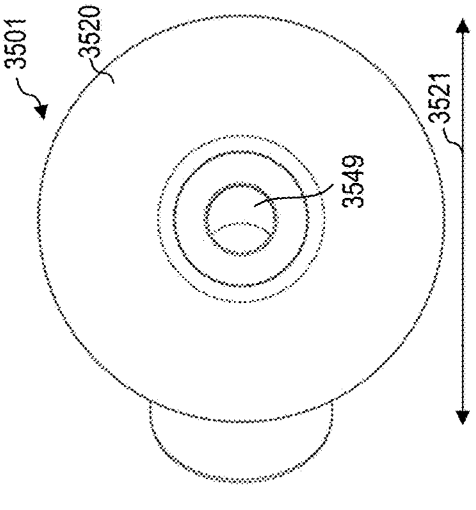
FIG. 35B is a bottom view of pliable angled-handle earpiece sound-attenuating stem 3501, according to some embodiments of the present invention.

FIG. 35B is a bottom view of pliable earpiece sound-attenuating stem 3501, showing the perimeter of sound-attenuating pliable distal flange 3520 and the internal (inside-the-car) opening of interior channel 3549.

FIG. 35C is a cross-sectional side view of a pliable angled-handle earpiece sound-attenuating stem 3501, according to some embodiments of the present invention. In some embodiments, pliable sound-attenuating stem 3501 includes a proximal (external to the car canal) flange 3510 (having an outer/proximal surface 3514, and a substantially flat interior/distal surface 3516), curved convex hollow distal (internal to the car canal) sound-attenuating pliable flange 3520, angled-handle portion 3530, an attachment portion 3540 configured to receive and retain a foam sound-attenuating element 3601 (See FIG. 36) having a narrowed end portion (having diameter 3542) in a spaced-apart relation to, and within a surrounding portion of, curved sound-attenuating distal flange 3520, and a tapered portion 3550 having a flat proximal surface 3556 that faces toward flat interior/distal surface 3516 of flange 3510. In some embodiments, the external lateral surface of tapered portion 3550 is shaped like the frustrum of a cone. In some embodiments, tapered portion 3550 is shaped to vary its stiffness from a more-stiff stiffness value at its proximal end (having a larger proximal external diameter 3551) to a less-stiff stiffness value at its distal end (having a distal external diameter 3552, wherein the proximal external diameter 3551 is larger than distal external diameter 3552), in order to reduce a tendency of tapered portion 3550 to collapse or bend sideways along its length 3557, yet still allow easier bending at bending location 3558 at the distal end of tapered portion 3550 to allow a variable angle of the pliable distal flange 3520 relative to the internal-to-the-car stem axis 3503.

In some embodiments, handle portion 3530 has a top surface 3536, which in some embodiments, is flat and perpendicular to handle axis 3502. In some embodiments, handle portion 3530 includes a handle channel 3539 that extends lengthwise and is continuous with, and open to, stem interior channel 3549 that extends lengthwise through attachment portion 3540, tapered portion 3550 and pliable distal flange 3520. In some embodiments, stem interior channel 3549 has a central axis 3503, and is not tapered, while in other embodiments (not shown here), channel 3539 and/or channel 3549 are tapered from a larger interior diameter 3545 at a distal end to a smaller in-between diameter 3546 located closer to where stem interior channel 3549 joins to angled-handle channel 3539. In some such embodiments, handle channel 3539 has a proximal diameter 3531 that is smaller than in-between diameter 3546. In this way, some embodiments provide a horn-shaped or continuously tapered interior channel that includes angled-handle channel 3539 and stem interior channel 3549 that join at an angle 3509 to one another (e.g., in some embodiments, angle 3509 is about 135 degrees, while in other embodiments, angle 3509 is an angle between about 100 degrees and about 170 degrees, for example, about 100 degrees, about 110 degrees, about 120 degrees, about 130 degrees, about 140 degrees, about 150 degrees, about 160 degrees, or about 170 degrees, or in a range between any pair of the above-listed single angles), and whose continuously tapered interior diameter is largest near the distal end (inside-the-car end) of interior channel 3549 and smallest near the proximal end (outside-the-car end) of handle channel 3539, and wherein the angled-handle-channel axis 3502 is at an obtuse angle to stem interior-channel axis 3503, in order to make easier the positioning of the car plug inside the car canals of different users having different car-canal geometries.

In some embodiments, attachment portion 3540 has a constant outer diameter along its length such that proximal external diameter 3541 is equal to distal external diameter 3542. In some such embodiments, interior channel 3549 has a constant interior diameter, while other such embodiments, which are more preferred for some uses, include a tapered (horn-shaped) interior channel 3549 that is wider at its distal end (inside-the-car end) than at its proximal end (outside-the-car end). In still other embodiments, interior channels 3539 and 3549 together form an overall channel that tapers from a largest diameter at its proximal end (outside-the-car end) and smallest near its distal end (inside-the-car end).

In other embodiments, attachment portion 3540 has a tapered outer diameter along its length such that proximal external diameter 3541 is larger than distal external diameter 3542. In some such embodiments, where attachment portion 3540 is tapered along its length such that proximal external diameter 3541 is larger than distal external diameter 3542, and where the interior channel 3549 is tapered in the opposite direction, the resulting stem is more flexible at its distal end than at its proximal end.

In other embodiments (not shown), there are no air channels through pliable stem 3501 (e.g., in some such embodiments, pliable stem 3501 and assembled earpiece 3701 (described below) provide a full block against sound and against changes in air pressure between the external environment and the user's eardrum).

Figure 36:
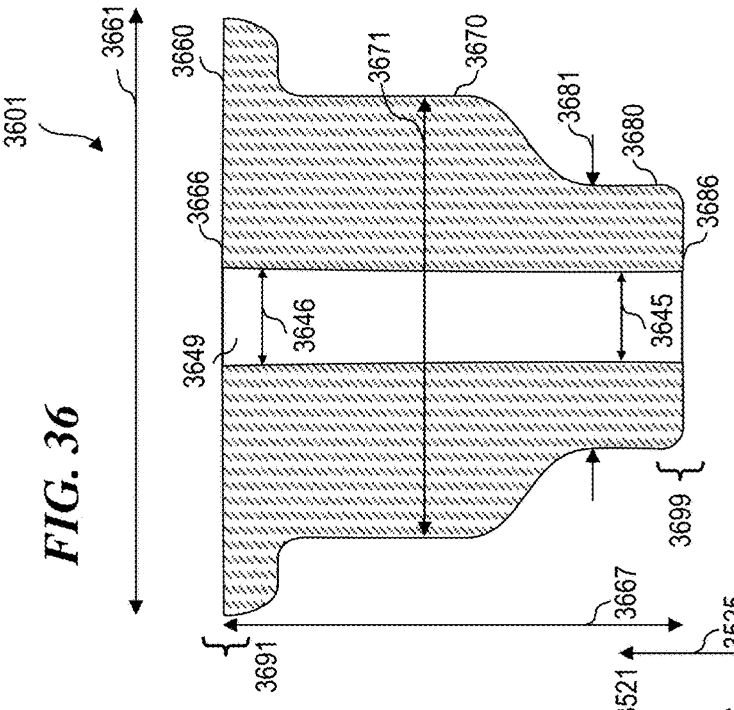
FIG. 36 is a cross-sectional side view of a foam sound-attenuating element 3601, according to some embodiments of the present invention.

FIG. 36 is a cross-sectional side view of a foam sound-attenuating element 3601, according to some embodiments of the present invention. In some embodiments, foam sound-attenuating element 3601 is substantially the same as foam sound-attenuating element 1601 described above for FIG. 16. In some embodiments, foam sound-attenuating element 3601 (also called sound-attenuation plug 3601) includes an internal first channel 3649 that passes through an entire length of the sound-attenuation plug 3601 and that has a proximal-end inner diameter 3646 near the receiver end 3691 of sound-attenuating element 3601 and a distal end internal diameter 3645 near the emitter end 3691 of sound-attenuating element 3601. In some embodiments, foam sound-attenuating element 3601 is made of a visco-elastic foam (also called memory form) that, once temporarily compressed, slowly restores (e.g., over a period of about 5 seconds to about 30 seconds) toward a default fully expanded shape or toward a shape that conforms gently to the shape of the user's ear canal. In some embodiments, foam sound-attenuating element 3601 includes external flange 3660 configured to seal against an external end perimeter of the ear canal of a user, a middle section 3670 configured to seal to the interior portion of the user's ear canal, and a smaller-diameter distal portion 3680 sized to fit inside the sound-attenuating pliable distal flange 3520 of stem 3501, spaced apart to be not touching (or mostly not touching) sound-attenuating pliable distal flange 3520. The visco-elastic foam of foam sound-attenuating element 3601 allows the user to roll the resulting assembled ear plug 3701 (see FIG. 37A) between thumb and fingers to a small diameter to facilitate easy insertion fully into the user's ear canal such that ear plug 3701 slowly expands to conform to and seal to the user's ear canal. In some embodiments, a top/proximal flat surface 3666 of foam sound-attenuating element 3601 will compress against or be nearest to flat interior/distal surface 3516 of flange 3510, and a bottom/distal flat surface 3686 of foam sound-attenuating element 3601 will compress against or be nearest to flat proximal surface 3556 of tapered (e.g., frustrum-shaped) section 3550.

Figures 37A, 37B, 37C, 37D:
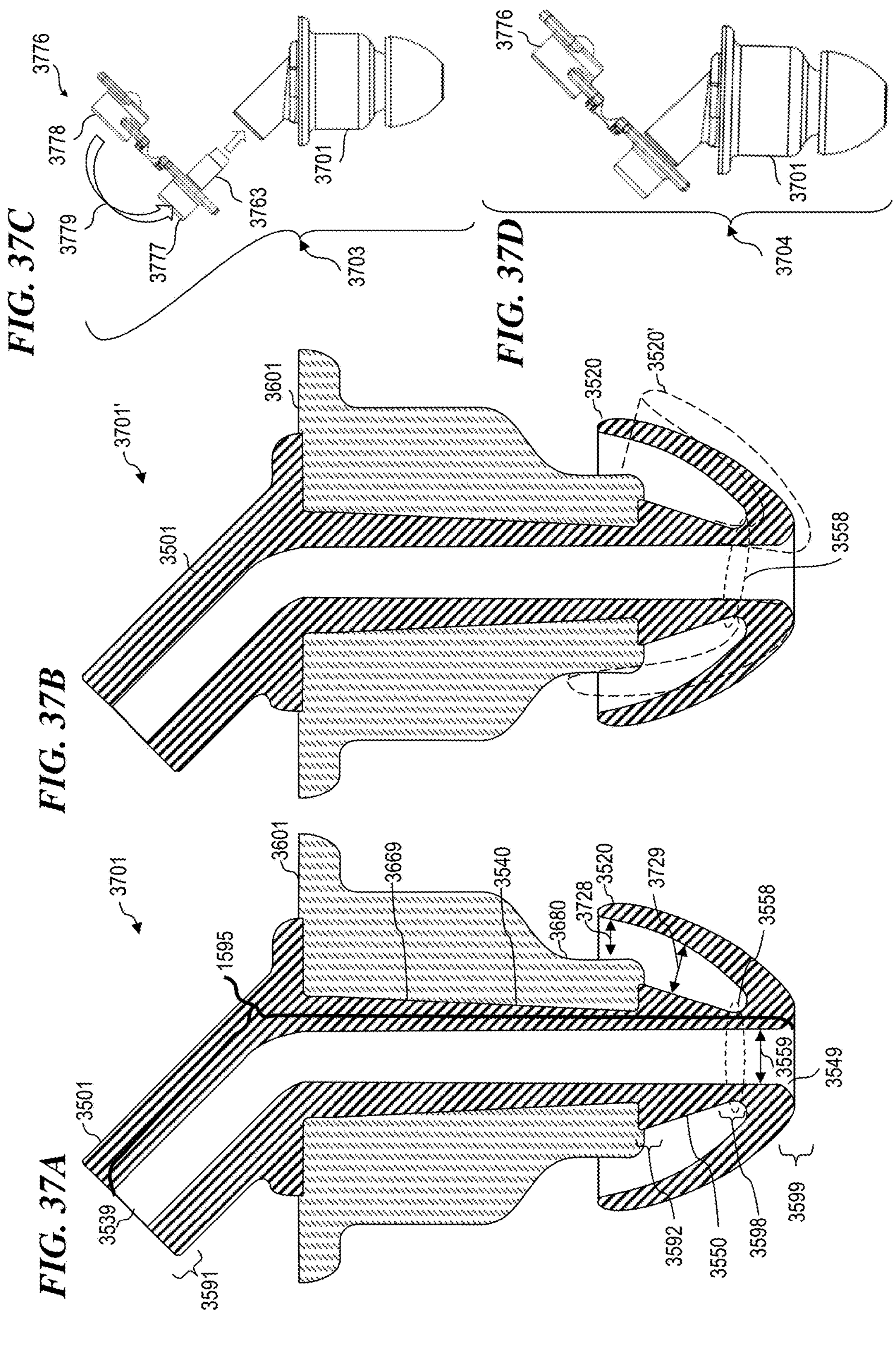
FIG. 37A is a cross-sectional side view of an assembled earpiece 3701 that includes pliable sound-attenuating stem 3501 and foam sound-attenuating element 3601, according to some embodiments of the present invention.
FIG. 37B is a cross-sectional side view of assembled earpiece 3701' that includes pliable sound-attenuating stem 3501 and foam sound-attenuating element 3601, showing sound-attenuating pliable distal flange in its default position labeled 3520, and in dashed-line outline of a bent position, labeled 3520'.
FIG. 37C is a side view of an assembly process 3703 showing assembled earpiece 3701 being assembled with additional insert 3776, according to some embodiments of the present invention.
FIG. 37D is a side view of an assembled earpiece system 3704 including additional insert 3776 inserted into assembled earpiece 3701, according to some embodiments of the present invention.

FIG. 37A is a cross-sectional side view of an assembled earpiece 3701 that includes pliable sound-attenuating stem 3501 and foam sound-attenuating element 3601, according to some embodiments of the present invention. In some embodiments, pliable sound-attenuating stem 3501 (also called pliable base 3501) has a receiver end 3591 and an emitter end 3599, and includes tapered portion 3550 (also called stop section 3550) that has a receiver end 3592 and an emitter end 3598 of stop section 3550. In some embodiments, earpiece 3701 is assembled by stretching and forcing foam sound-attenuating element 3601 over the end of pliable distal flange 3520 and into position around attachment portion 3540 of stem 3501, wherein top/proximal surface 3666 of foam sound-attenuating element 3601 is compressed against flat interior/distal surface 3516 of flange 3510, and bottom/distal flat surface 3686 of foam sound-attenuating element 3601 is compressed against flat proximal surface 3556 of tapered section 3550. Together, handle channel 3539 and stem channel 3549 form a second channel 3595 that passes through an entire length of the pliable base 1501

FIG. 37B is a cross-sectional side view of assembled earpiece 3701' that includes pliable sound-attenuating stem 3501 and foam sound-attenuating element 3601, showing sound-attenuating pliable distal flange in its default position labeled 3520, and in dashed-line outline of a bent position, labeled 3520'.

FIG. 37C is a side view of an assembly process 3703 showing assembled earpiece 3701 being assembled with additional capped-filter insert 3776, according to some embodiments of the present invention. In some embodiments, any suitable insert, such as capped filter 3776 (e.g., a capped filter similar to the sound filters described in U.S. Pat. No. 9,603,746, which was introduced above) is inserted into handle channel 3539 of assembled earpiece 3701 (or into handle channel 1539 of assembled earpiece 1701 shown in FIG. 17C and FIG. 20). In some embodiments, capped filter 3776 includes a filter portion 3763 having a central channel with a pinhole aperture in the central channel to minimize percussive or explosive sounds, as well as a port boss 3777 onto which a user can selectively cover (occlude the channel, such as if the user were to be using a firearm or be near a jet engine or air compressor) or uncover (e.g., for situations involving conversations with others) with the hinged cap 3778 (with the capping motion indicated by curved arrow 3779).

FIG. 37D is a side view of an assembled earpiece system 3704 including additional insert 3776 inserted into assembled earpiece 3701, according to some embodiments of the present invention.

Figure 38:
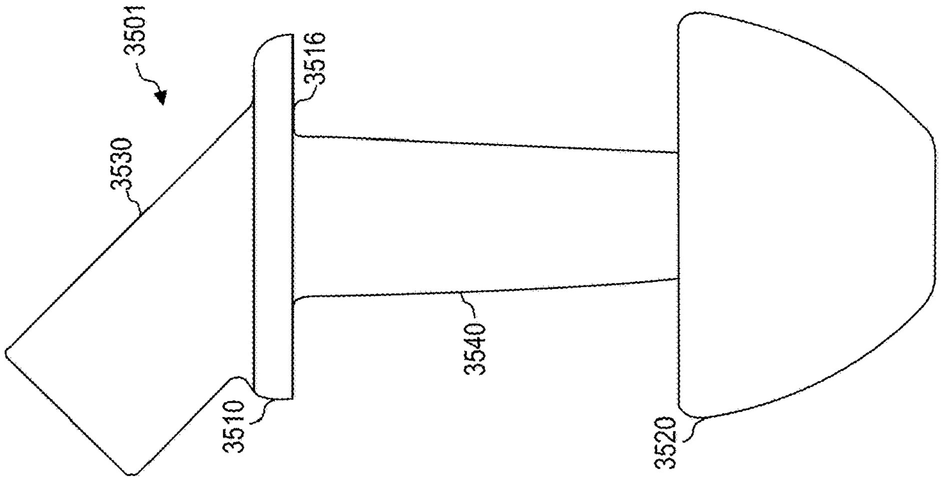
FIG. 38 is a side view of pliable earpiece sound-attenuating stem 3501, according to some embodiments of the present invention.

FIG. 38 is a side view of pliable earpiece sound-attenuating stem 3501, according to some embodiments of the present invention. The reference numbers are as described above for FIG. 35C.

Figure 39:
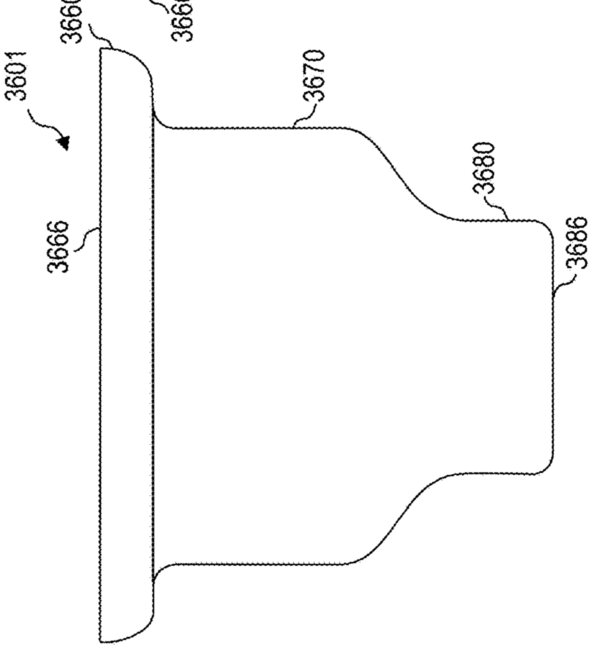
FIG. 39 is a side view of secondary foam sound-attenuating element 3601, according to some embodiments of the present invention.

FIG. 39 is a side view of foam sound-attenuating element 3601, according to some embodiments of the present invention. The reference numbers are as described above for FIG. 36.

Figure 40:
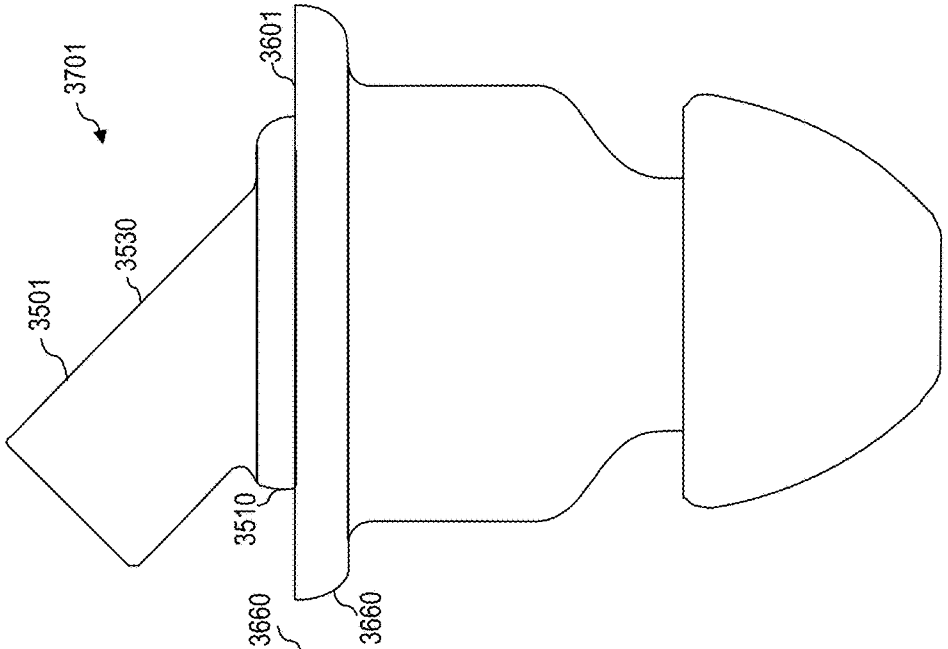
FIG. 40 is a side view of assembled earpiece 3701 that includes pliable sound-attenuating stem 3501 and secondary foam sound-attenuating element 3601, according to some embodiments of the present invention.

FIG. 40 is a side view of assembled earpiece 3701 that includes pliable sound-attenuating stem 3501 and foam sound-attenuating element 3601, according to some embodiments of the present invention. The reference numbers are as described above for FIG. 37.

Figure 41:
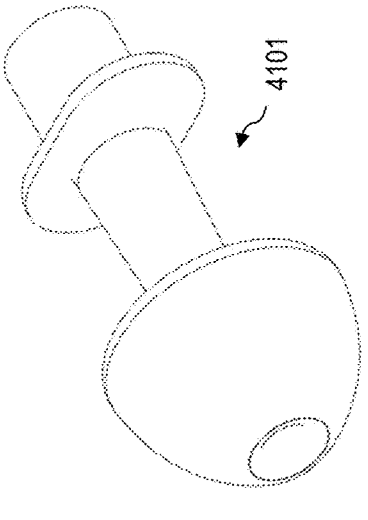
FIG. 41 is a perspective view of an earpiece stem 4101 having an in-line handle, according to some embodiments of the present invention.

FIG. 41 is a perspective view of an earpiece stem 4101 having an in-line handle, according to some embodiments of the present invention.

Figure 43:
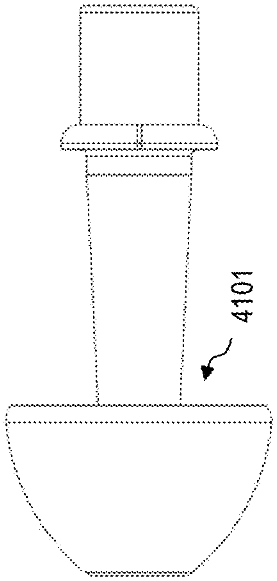
FIG. 43 is a right-side view of earpiece stem 4101 having an in-line handle, according to some embodiments of the present invention.
Figure 42:
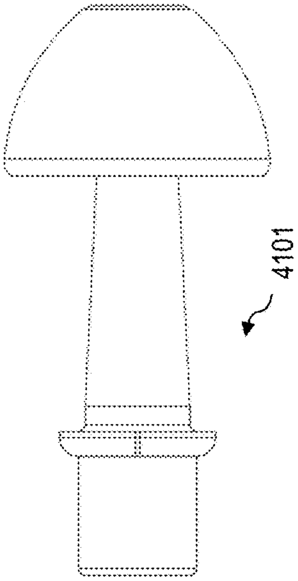
FIG. 42 is a left-side view of earpiece stem 4101 having an in-line handle, according to some embodiments of the present invention.

FIG. 42 is a left-side view of earpiece stem 4101 having an in-line handle FIG. 43 is a right-side view of earpiece 4101 stem having an in-line handle.

Figure 44:
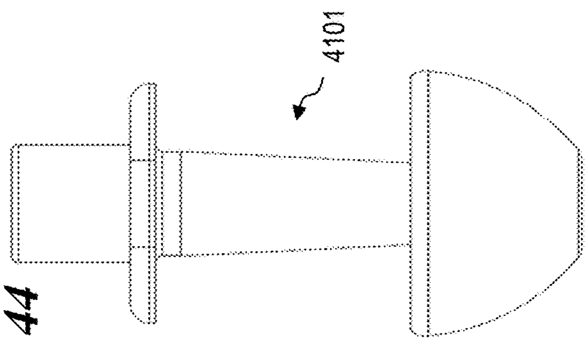
FIG. 44 is a front view of earpiece stem 4101 having an in-line handle, according to some embodiments of the present invention.

FIG. 44 is a front view of earpiece stem 4101 having an in-line handle.

Figure 45:
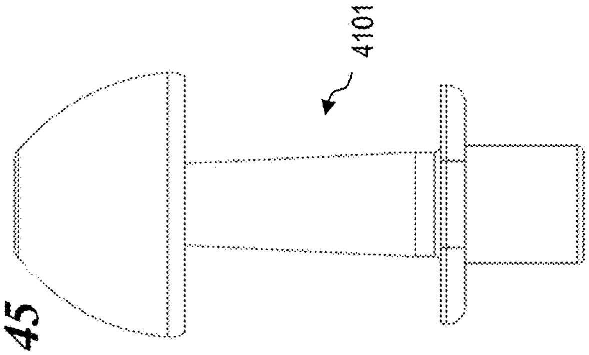
FIG. 45 is a back view of earpiece stem 4101 having an in-line handle, according to some embodiments of the present invention.

FIG. 45 is a back view of earpiece stem 4101 having an in-line handle.

Figure 46:
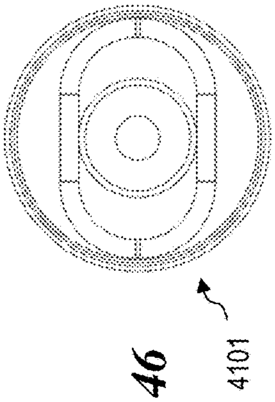
FIG. 46 is a top view of earpiece stem 4101 having an in-line handle, according to some embodiments of the present invention.

FIG. 46 is a top view of earpiece stem 4101 having an in-line handle.

Figure 47:
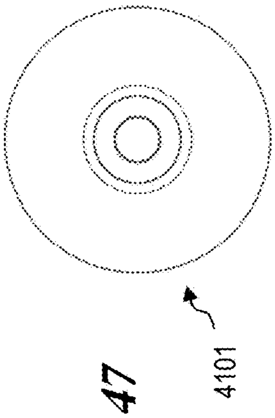
FIG. 47 is a bottom view of earpiece stem 4101, according to some embodiments of the present invention.

FIG. 47 is a bottom view of earpiece stem 4101 having an in-line handle.

Figure 48:
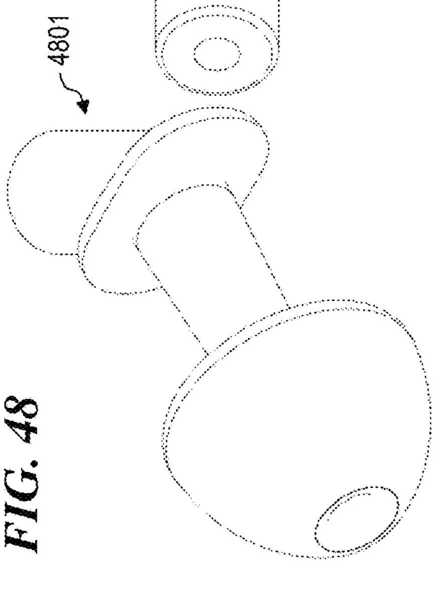
FIG. 48 is a perspective view of an earpiece stem 4801 having an angled handle, according to some embodiments of the present invention.

FIG. 48 is a perspective view of an earpiece stem 4801 having an angled handle, according to some embodiments of the present invention.

Figure 49:
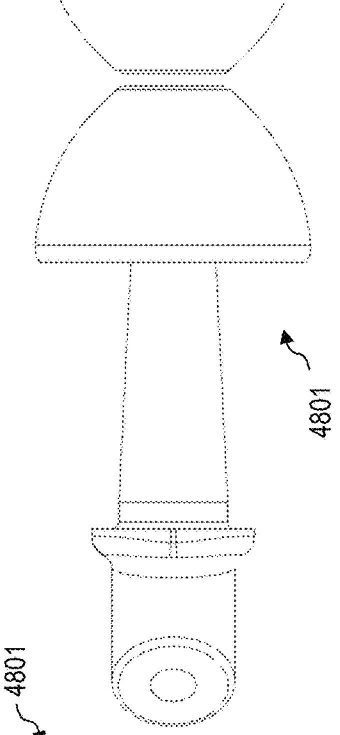
FIG. 49 is a left-side view of earpiece stem 4801 having an angled handle, according to some embodiments of the present invention.

FIG. 49 is a left-side view of earpiece stem 4801 having an angled handle.

Figure 50:
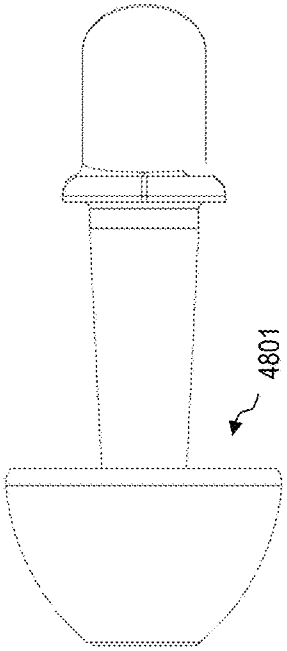
FIG. 50 is a right-side view of earpiece stem 4801 having an angled handle, according to some embodiments of the present invention.

FIG. 50 is a right-side view of earpiece stem 4801 having an angled handle.

Figure 51:
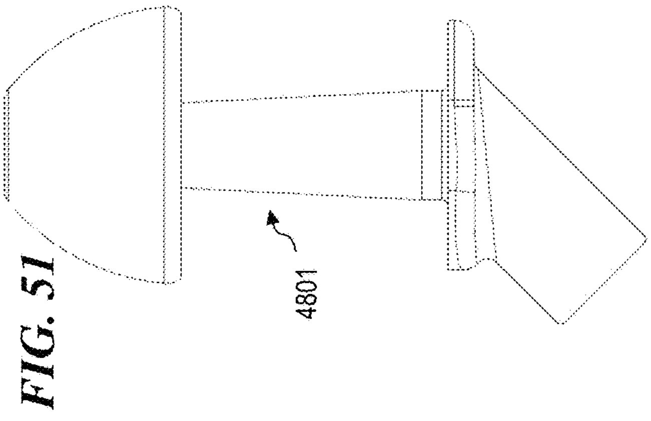
FIG. 51 is a front view of earpiece stem 4801 having an angled handle, according to some embodiments of the present invention.

FIG. 51 is a front view of earpiece stem 4801 having an angled handle.

Figure 52:
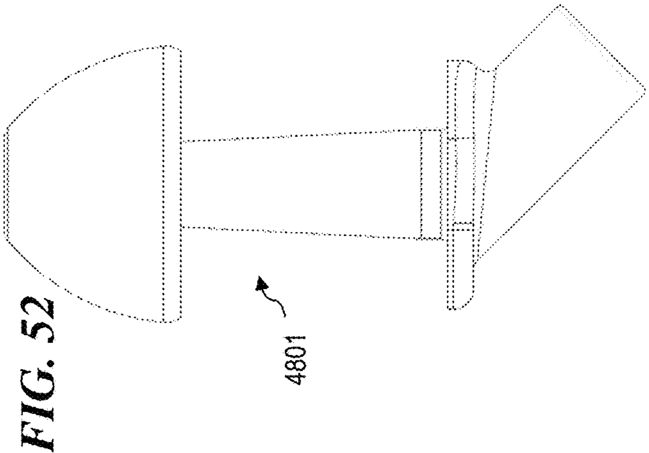
FIG. 52 is a back view of earpiece stem 4801 having an angled handle, according to some embodiments of the present invention.

FIG. 52 is a back view of earpiece stem 4801 having an angled handle.

Figure 53:
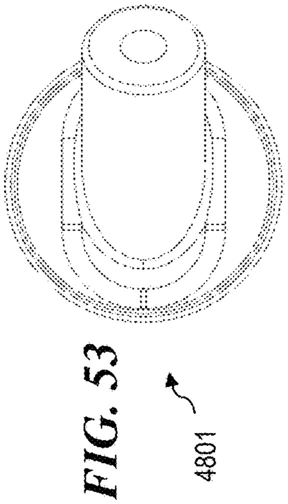
FIG. 53 is a top view of earpiece stem 4801 having an angled handle, according to some embodiments of the present invention.

FIG. 53 is a top view of earpiece stem 4801 having an angled handle.

Figure 54:
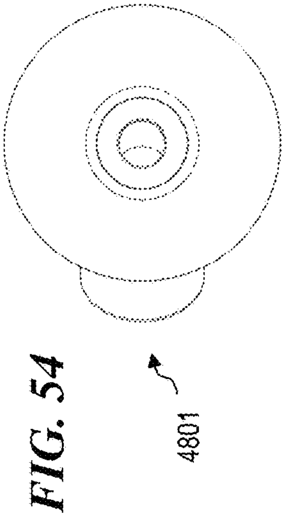
FIG. 54 is a bottom view of earpiece stem 4801 having an angled handle, according to some embodiments of the present invention.

FIG. 54 is a bottom view of earpiece stem 4801 having an angled handle.

FIG. 55 is a perspective view of a curved communications insert 5501 having a barbed insertion shaft, according to some embodiments of the present invention.

FIG. 56 is a left-side view of curved communications insert 5501, according to some embodiments of the present invention.

FIG. 57 is an outside-end view of curved communications insert 5501, according to some embodiments of the present invention.

FIG. 58 is a back-end view of curved communications insert 5501, according to some embodiments of the present invention.

FIG. 59 is a view opposite to the outside-end view of FIG. 57 of curved communications insert 5501, according to some embodiments of the present invention.

FIG. 60 is a view opposite to the back-end view of FIG. 58 of curved communications insert 5501, according to some embodiments of the present invention.

FIG. 61 is a right-side view of curved communications insert 5501, according to some embodiments of the present invention.

Figure 62:
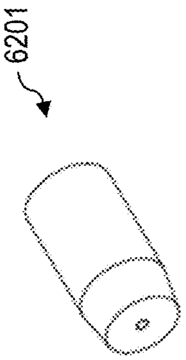
FIG. 62 is a perspective view of a straight filter insert 6201, according to some embodiments of the present invention.

FIG. 62 is a perspective view of a straight filter insert 6201, according to some embodiments of the present invention. In some embodiments, the straight filter insert shown in FIGS. 62-68 includes a central through-channel having a central pinhole aperture or narrowed passageway (e.g., such as pinhole passageway 6211 shown in FIG. 91 and FIG. 93).

Figure 63:
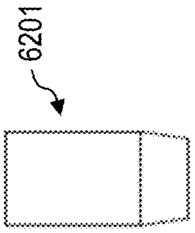
FIG. 63 is a left-side view of filter insert 6201, according to some embodiments of the present invention.

FIG. 63 is a left-side view of filter insert 6201.

Figure 64:
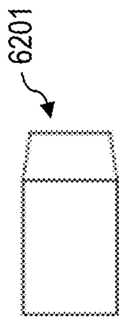
FIG. 64 is a front-side view of filter insert 6201, according to some embodiments of the present invention.

FIG. 64 is a front-side view of filter insert 6201.

Figure 65:
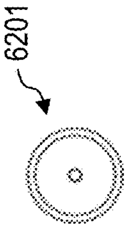
FIG. 65 is a distal-end view of filter insert 6201, according to some embodiments of the present invention.

FIG. 65 is a distal-end view of filter insert 6201.

Figure 66:
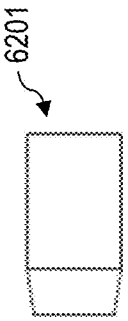
FIG. 66 is a back-side view of filter insert 6201, according to some embodiments of the present invention.

FIG. 66 is a back-side view of filter insert 6201.

Figure 67:
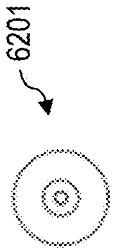
FIG. 67 is a proximal-end view of filter insert 6201, according to some embodiments of the present invention.

FIG. 67 is a proximal-end view of filter insert 6201.

Figure 68:
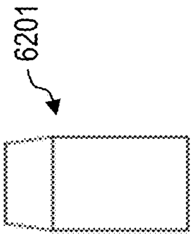
FIG. 68 is a right-side view of filter insert 6201, according to some embodiments of the present invention.

FIG. 68 is a right-side view of filter insert 6201.

FIG. 69 is a perspective view of a flexible straight communications insert 6901 having an un-barbed insertion shaft 6920, according to some embodiments of the present invention. In other embodiments, the insertion shaft is barbed (such as shown on the elbow of FIGS. 55-61). In some embodiments, straight communications insert 6901 is configured to be inserted into an elbow of FIGS. 55-61, and/or directly into an assembled earpiece 1701 or 3701, such as described above. In some embodiments, straight communications insert 6901 (as shown in the various views of FIGS. 69-75) includes one or more lengths of flexible hollow polymer tubing 6911 . . . 6913 (only short sections of which is shown here) scaled to a proximal end of flexible polymer insertion shaft 6920, and each of which has a suitable length (such as 0.75 meter, or in various other embodiments, 10 to 300 cm or other suitable length), wherein a far end of the tubing is operatively coupled to a sound transducer such as an earbud, cell phone, radio or other suitable source of sound. In some embodiments, insertion shaft 6920 is made as a unitary piece of polymer tubing sized at the insertion end to fit into the curved communications insert of FIGS. 55-61, or to fit directly into channel 1539 of assembled earpiece 1701 shown in FIG. 17A or channel 3539 of assembled earpiece 3701 shown in FIG. 37A. In some embodiments, the combination of assembled earpiece 1701 or assembled earpiece 3701 with flexible straight communications insert 6901 having a suitable length of flexible hollow polymer tubing 6911 makes it easy for a user wearing a helmet or other headgear to clearly hear hands-free communications from a cellphone or other wireless receiver or transceiver that is not necessarily in the helmet or headgear.

FIG. 70 is a left-side view of straight communications insert 6901.

FIG. 71 is an outside-end view of straight communications insert 6901.

FIG. 72 is a back-end view of straight communications insert 6901.

FIG. 73 is a view opposite to the outside-end view of FIG. 71 of straight communications insert 6901, according to some embodiments of the present invention.

FIG. 74 is a front-side view of straight communications insert 6901, according to some embodiments of the present invention.

FIG. 75 is a right-side view of straight communications insert 6901, according to some embodiments of the present invention.

Figures 76, 77, 78, 79, 80, 81, 82:
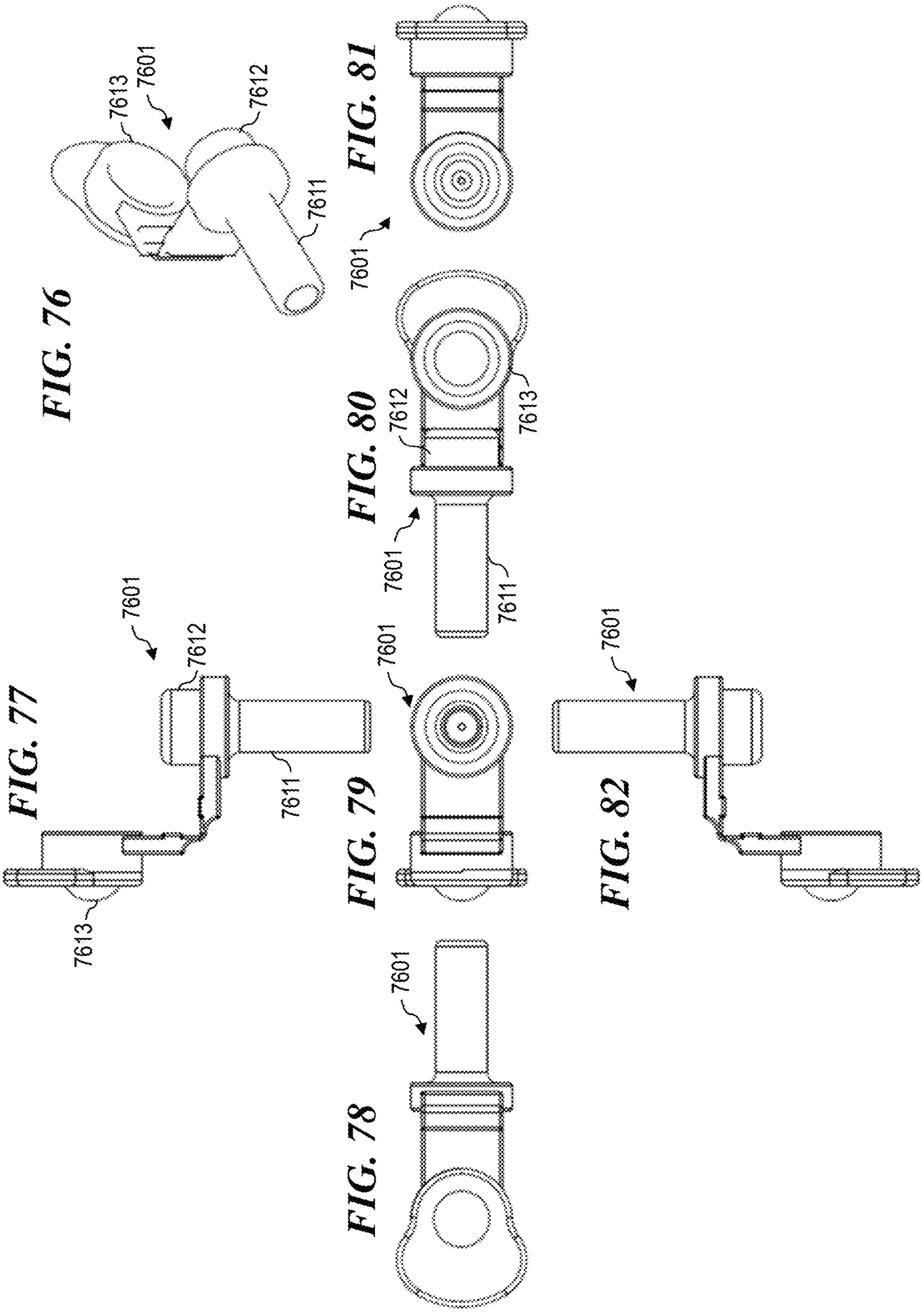
FIG. 76 is a perspective view of a filter-with-openable-cap insert 7601 having an un-barbed insertion shaft, according to some embodiments of the present invention.
FIG. 77 is a left-side view of filter-with-openable-cap insert 7601, according to some embodiments of the present invention.
FIG. 78 is an outside-end view of filter-with-openable-cap insert 7601, according to some embodiments of the present invention.
FIG. 79 is a back-end view of filter-with-openable-cap insert 7601, according to some embodiments of the present invention.
FIG. 80 is a view opposite to the outside-end view of FIG. 71 of filter-with-openable-cap insert 7601, according to some embodiments of the present invention.
FIG. 81 is a front-side view of filter-with-openable-cap insert 7601, according to some embodiments of the present invention.
FIG. 82 is a right-side view of filter-with-openable-cap insert 7601, according to some embodiments of the present invention.

FIG. 76 is a perspective view of a filter-with-openable-cap insert 7601 having an un-barbed insertion shaft, according to some embodiments of the present invention. In some embodiments, filter-with-openable-cap insert 7601 has a cap that when open, allows the user to clearly hear voices and maintain good situational awareness; however, when an impulse noise (such as gunfire) occurs, the filter portion with the pinhole aperture inside the filter body located inside the instantly reduces the noise, protecting the user's ears, and the louder the blast, the higher the noise reduction. In some embodiments, a variety of different inserts 7601 are provided, such that the pinhole aperture size in each is of a different size, and thus each has a corresponding higher or lower noise reduction ratio (NRR), allowing the user to select a specific filter-with-openable-cap insert 7601 suitable for each various situation. With the cap in the closed position, a much higher NRR is achieved for any of the filter-with-openable-cap inserts 7601, providing even better ear protection for those environments.

FIG. 77 is a left-side view of the filter-with-openable-cap insert 7601, according to some embodiments of the present invention.

FIG. 78 is an outside-end view of the filter-with-openable-cap insert 7601, according to some embodiments of the present invention.

FIG. 79 is a back-end view of the filter-with-openable-cap insert 7601, according to some embodiments of the present invention.

FIG. 80 is a view opposite to the outside-end view of FIG. 71 of the filter-with-openable-cap insert, according to some embodiments of the present invention.

FIG. 81 is a front-side view of the filter-with-openable-cap insert 7601, according to some embodiments of the present invention.

FIG. 82 is a right-side view of the filter-with-openable-cap insert 7601, according to some embodiments of the present invention.

Figure 83:
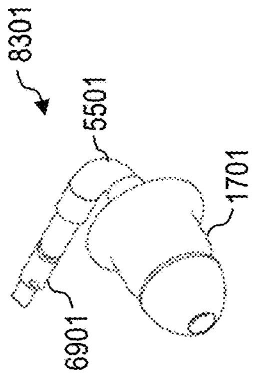
FIG. 83 is a perspective view of an earpiece system 8301 with communications adaptor 6901, elbow 5501 having a barbed insertion shaft, and filter 6201 (see also FIG. 91), according to some embodiments of the present invention.

FIG. 83 is a perspective view of a communications earpiece system 8301 with communications adaptor 6901, elbow 5501 having a barbed insertion shaft, and filter 6201 (see also FIG. 91), according to some embodiments of the present invention.

Figure 84:
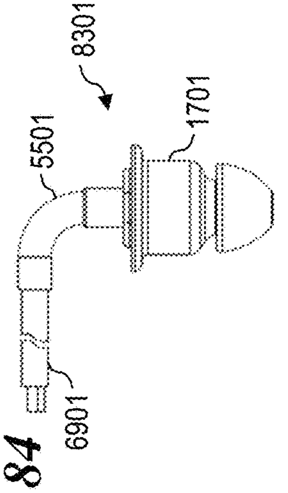
FIG. 84 is a left-side view of earpiece system 8301, according to some embodiments of the present invention.

FIG. 84 is a left-side view of the earpiece system 8301.

Figure 85:
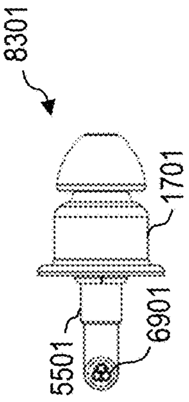
FIG. 85 is an outside-end view of earpiece system 8301, according to some embodiments of the present invention.

FIG. 85 is an outside-end view of the earpiece system 8301.

Figure 86:
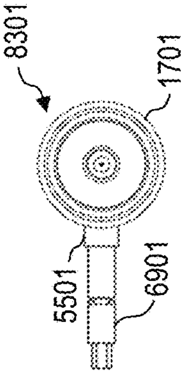
FIG. 86 is a back-end view of earpiece system 8301, according to some embodiments of the present invention.

FIG. 86 is a bottom view of the earpiece system 8301.

Figure 87:
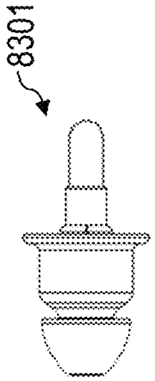
FIG. 87 is a view opposite to outside-end view of FIG. 85 of earpiece system 8301, according to some embodiments of the present invention.

FIG. 87 is a view opposite to the outside-end view of FIG. 85 of the earpiece system 8301.

Figure 88:
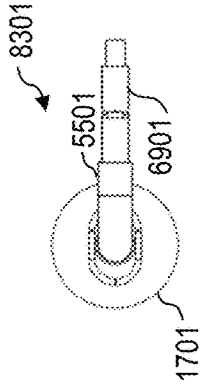
FIG. 88 is a front-side view of earpiece system 8301, according to some embodiments of the present invention.

FIG. 88 is a top view of the earpiece system 8301.

Figure 89:
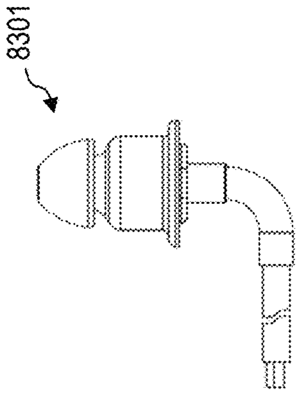
FIG. 89 is a right-side view of earpiece system 8301, according to some embodiments of the present invention.

FIG. 89 is a right-side view of the earpiece system 8301.

Figure 90:
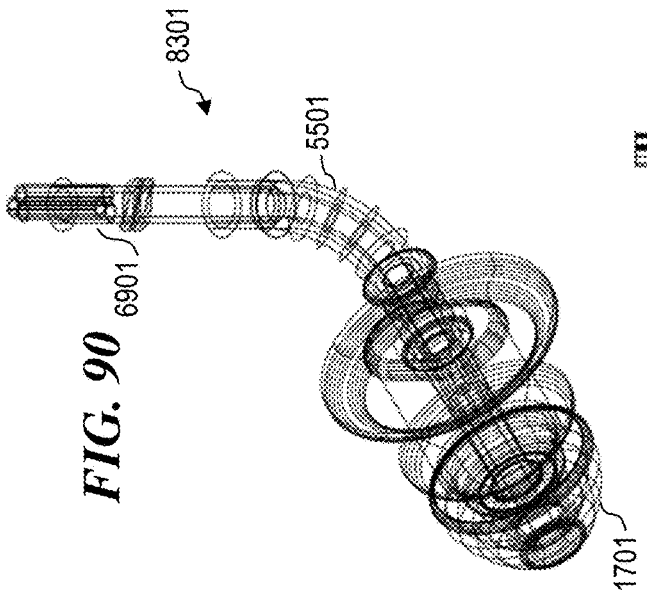
FIG. 90 is a perspective wireframe view of an earpiece system 8301 with communications adaptor 6901, elbow 5501 having a barbed insertion shaft, and filter 6201 (see also FIG. 91), according to some embodiments of the present invention.

FIG. 90 is a perspective wireframe view of an earpiece system 8301 with communications adaptor 6901, elbow 5501 having a barbed insertion shaft, and filter 6201 (see also FIG. 91), according to some embodiments of the present invention.

Figure 91:
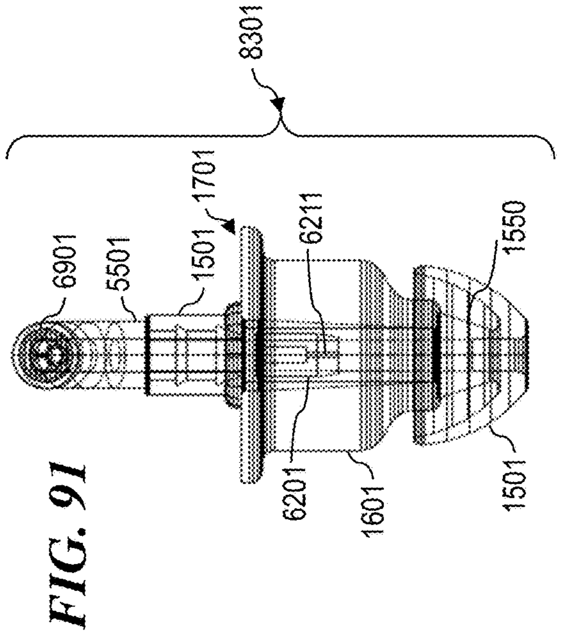
FIG. 91 is an outside-end wireframe view of earpiece system 8301, according to some embodiments of the present invention.

FIG. 91 is an outside-end wireframe view of the earpiece system 8301, with straight assembled earpiece 1701, communications adaptor 6901, elbow 5501 having a barbed insertion shaft, and short filter 6201 according to some embodiments of the present invention. In some embodiments, filter 6201 (which is inserted into channel 1549 (see FIG. 15)) has a narrow portion 6211 (also called a pinhole aperture having a variable-length narrowed portion 6211 that substantially attenuates percussive and explosive sounds). In some embodiments, communications adaptor 6901 is inserted into one end of elbow 5501, which has a barbed insertion shaft as shown here, while in other embodiments, a straight insertion shaft is used. In some embodiments, straight assembled earpiece 1701 includes pliable earpiece sound-attenuating stem 1501 and foam sound-attenuating element 1601

Figure 92:
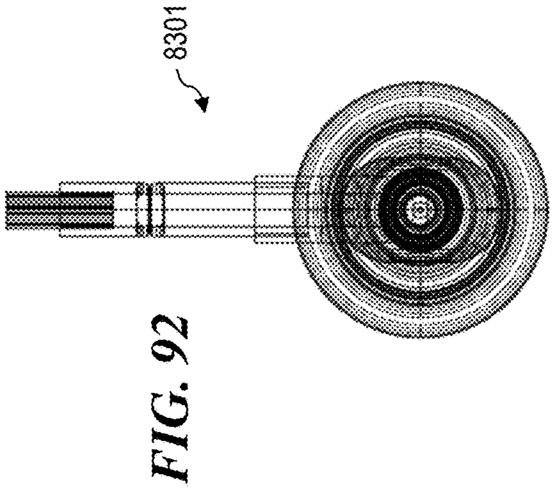
FIG. 92 is a back-end-end view of earpiece system 8301, according to some embodiments of the present invention.

FIG. 92 is a back-end-end view of the earpiece system 8301.

Figure 93:
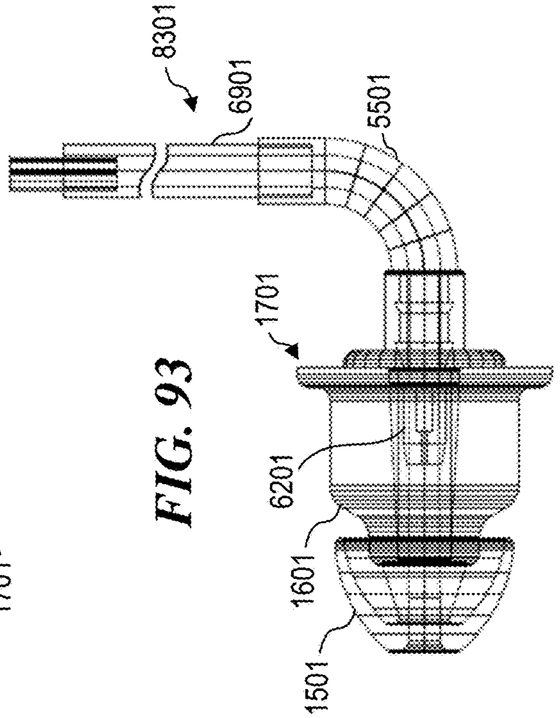
FIG. 93 is a left-side view of earpiece system 8301, according to some embodiments of the present invention.

FIG. 93 is a left-side view of the earpiece system 8301.

The inventor has discovered that assembled earpiece 1701 and assembled earpiece 3701, as well as earpiece systems that further include optional capped filter inserts (such as filter-with-openable-cap insert 7601 shown in FIGS. 76-82) or communications earpiece system 8301 (shown in FIGS. 93-93), all have superior sound-dampening properties as compared to other ear plugs, particularly at frequencies below 200 hertz. In some embodiments, assembled earpiece 1701 and assembled earpiece 3701 as well as earpiece systems that further include capped filter inserts (such as filter-with-openable-cap insert 7601 shown in FIGS. 76-82) or communications earpiece system 8301 (shown in FIGS. 93-93), all have substantially flat attenuation-value graphs across a wider range of frequencies than do conventional car plugs.

In some embodiments, the present invention provides a first sound-attenuation system for placement at least partially in an car canal of a person. This first sound-attenuation system includes: a pliable base (also called a stem) having an emitter end and a receiver end, wherein the base/stem includes: a first flange at the emitter end of the base/stem, wherein the first flange has a cup-like shape having a convex external surface generally facing the emitter end of the base/stem and configured to engage the car canal to create a seal in the car canal, and wherein the first flange has a concave inner surface generally facing the receiver end of the base/stem; a stop section having a proximal top surface located within the cup-like shape of the first flange, wherein the stop section has an emitter end and a receiver end; a sound-attenuation plug having an emitter end and a receiver end, wherein the sound-attenuation plug includes a first channel that passes through an entire length of the sound-attenuation plug, wherein the sound-attenuation plug is configured to couple over the base/stem such that the emitter end of the sound-attenuation plug is held in place by the receiver end of the stop section and at least a portion of the sound-attenuation plug extends within the cup-like shape of the first flange.

In some embodiments of the first sound-attenuation system, the base/stem includes a second channel that passes through an entire length of the base/stem.

In some embodiments of the first sound-attenuation system, an outer diameter of the base/stem decreases from the receiver end of the base/stem to the emitter end of the base/stem.

In some embodiments of the first sound-attenuation system, the sound-attenuation plug includes a foam body.

In some embodiments of the first sound-attenuation system, the stop has a conical frustum shape having a first diameter at the receiver end of the stop and a second diameter at the emitter end of the stop, and wherein the first diameter is larger than the second diameter.

In some embodiments of the first sound-attenuation system, the base/stem further includes a second flange configured to hold the receiver end of the sound-attenuation plug in place.

In some embodiments of the first sound-attenuation system, the base/stem has a longitudinal axis that passes through an entire length of the base/stem.

In some embodiments of the first sound-attenuation system, the receiver end of the base/stem has a first longitudinal axis, wherein the emitter end of the base/stem has a second longitudinal axis, and wherein the first longitudinal axis is at a first angle relative to the second longitudinal axis.

In some embodiments, the present invention provides a first method for making a sound-attenuation car piece. The first method includes: forming a pliable base/stem having an emitter end and a receiver end, wherein the base/stem includes: a first flange at the emitter end of the base/stem, wherein the first flange has a cup-like shape having a convex external surface facing the emitter end of the base/stem and configured to engage the car canal to create a seal in the car canal, wherein the first flange has a concave inner surface facing the receiver end of the base/stem, a stop located within the cup-like shape of the first flange, wherein the stop has an emitter end and a receiver end; forming a sound-attenuation plug having an emitter end and a receiver end, wherein the sound-attenuation plug includes a first channel that passes through an entire length of the sound-attenuation plug; and coupling the sound-attenuation plug to the base/stem such that at least a portion of the sound-attenuation plug is contained within the cup-like shape of the first flange; and holding the emitter end of the sound-attenuation plug in place using the receiver end of the stop.

In some embodiments of the first method, the forming of the base/stem includes creating a second channel that passes through an entire length of the base/stem.

In some embodiments of the first method, the forming of the base/stem includes decreasing an outer diameter of the base/stem from the receiver end of the base/stem to the emitter end of the base/stem.

In some embodiments of the first method, the sound-attenuation plug includes a foam body.

In some embodiments of the first method, the stop has a conical frustum shape having a first diameter at the receiver end of the stop and a second diameter at the emitter end of the stop, and wherein the first diameter is larger than the second diameter.

In some embodiments of the first method, the base/stem further includes a second flange, the method further comprising holding the receiver end of the sound-attenuation plug in place using the second flange.

In some embodiments of the first method, the base/stem has a longitudinal axis that passes through an entire length of the base/stem.

In some embodiments of the first method, the receiver end of the base/stem forms a handle that has a first interior through channel having a first longitudinal axis, wherein the emitter end of the base/stem has a second interior through channel, connected to the first interior through channel, and having a second longitudinal axis, and wherein the first longitudinal axis is at a first angle relative to the second longitudinal axis. In some such embodiments, the first angle is about 135 degrees, while in other embodiments, the first angle, while in other embodiments, the first angle is an angle between about 100 degrees and about 170 degrees, for example, about 100 degrees, about 110 degrees, about 120 degrees, about 130 degrees, about 140 degrees, about 150 degrees, about 160 degrees, or about 170 degrees, or in a range between any pair of the above-listed single angles). In some embodiments, the second interior through channel and the first interior through channel together have a continuously tapered interior diameter that is largest near the distal end (inside-the-car end) of the second interior channel and smallest near the proximal end (outside-the-car end) of first interior channel, and wherein the first longitudinal axis is at an obtuse angle to the second longitudinal axis, in order to make easier the positioning and rotation of the ear plug inside the car canals of different users having different car-canal geometries.

In some embodiments, the present invention provides an apparatus that includes a single-piece pliable earpiece stem having: a handle portion having an exterior shape with a maximum diameter, a length, a proximal end and a distal end; a proximal flange located at the distal end of the handle portion, wherein the proximal flange has an outward-facing proximal surface and an inward-facing distal surface; an attachment portion having an exterior shape with a maximum diameter, a length, a proximal end and a distal end; a tapered stop located at the distal end of the handle portion, the tapered stop having a proximal surface extending radially outward at a proximal end of the tapered stop, a maximum diameter near the proximal end of the tapered stop and a minimum diameter near a distal end of the tapered stop; and a curved distal flange located at the distal end of the tapered stop, wherein the curved distal flange has a convex external surface and a concave internal surface, and wherein the tapered stop is located completely within the curved distal flange.

Some embodiments of the apparatus further include: a single-piece visco-elastic foam sound-attenuating element positioned on the earpiece stem to surround the attachment portion between the proximal flange and the proximal surface of the tapered stop, wherein the foam sound-attenuating element has a proximal flange having a flange diameter that is larger than a largest diameter of the proximal flange, a middle portion having a middle-portion diameter that is smaller than the flange diameter, and a distal portion having a distal-portion diameter that is smaller than the middle-portion diameter and sized to be in a spaced-apart relation to the concave internal surface of the curved sound-attenuating distal flange of the pliable earpiece stem, wherein the visco-elastic foam sound-attenuating element has a length between a flat proximal surface of the proximal flange and a distal end surface of the distal portion, wherein the length of the visco-elastic foam sound-attenuating element is longer than a spacing between the outer proximal surface and the inner distal surface of the pliable earpiece stem, wherein the visco-elastic foam sound-attenuating element takes at least thirty (30) seconds to return to a default uncompressed exterior shape after being released from a compressed shape, and wherein the pliable earpiece stem is made of a material having a durometer of about 35 Shore A. In some embodiments of the apparatus, the visco-elastic foam sound-attenuating element is affixed to the attachment portion of the earpiece stem with an adhesive. In other embodiments, the visco-elastic foam sound-attenuating element is temporarily stretched, slid over an end of the pliable earpiece stem, and then released to its desired position on the attachment portion of the earpiece stem.

Some embodiments of the apparatus further include: a single-piece visco-elastic foam sound-attenuating element positioned on the earpiece stem to surround the attachment portion between the proximal flange and the proximal surface of the tapered stop, wherein the foam sound-attenuating element has a proximal flange having a flange diameter that is larger than a largest diameter of the proximal flange, a middle portion having a middle-portion diameter that is smaller than the flange diameter, and a distal portion having a distal-portion diameter that is smaller than the middle-portion diameter and sized to be in a spaced-apart relation to the concave internal surface of the curved sound-attenuating distal flange of the pliable earpiece stem, wherein the visco-elastic foam sound-attenuating element takes at least five (5) seconds to return to a default uncompressed shape after being released from a compressed shape, and wherein the pliable earpiece stem is made of a material having a durometer of between about 30 Shore A and about 40 Shore A, inclusive. In some embodiments, the pliable earpiece stem is made of a material having a durometer of about 35 Shore A. In some embodiments, the pliable earpiece stem is made of a material having a durometer of about 35 Shore A (i.e., 32 to 38 Shore A). In some embodiments, the pliable earpiece stem is made of a material having a durometer of about 30 Shore A (i.e., 27 to 33 Shore A). In some embodiments, the pliable earpiece stem is made of a material having a durometer of about 40 Shore A (i.e., 37 to 43 Shore A). In some embodiments, the pliable earpiece stem is made of a material having a durometer of about 45 Shore A (i.e., 42 to 48 Shore A).

In some embodiments of the pliable earpiece stem, the pliable earpiece stem is made of a material having a durometer of about 35 Shore A.

In some embodiments of the pliable earpiece stem, the pliable earpiece stem is made of a material having a durometer of between about 30 Shore A and about 40 Shore A, inclusive.

In some embodiments of the pliable earpiece stem, the pliable earpiece stem has a continuous channel extending through the pliable earpiece stem from the proximal end of the handle portion through the distal surface of the curved distal flange.

In some embodiments of the pliable earpiece stem, an interior of the pliable earpiece stem is solid with no through channel.

In some embodiments of the pliable earpiece stem, the pliable earpiece stem has a continuous channel extending through the pliable earpiece stem from the proximal end of the handle portion through the distal surface of the curved distal flange, and wherein the channel has a first axis within the handle portion and a second axis within the attachment portion, the tapered portion and the distal flange, and wherein an angle between the first axis and the second axis is, or is about, 135 degrees.

Some embodiments of the apparatus further include: a foam sound-attenuating element positioned on the earpiece stem to surround the attachment portion between the proximal flange and the proximal surface of the tapered stop, wherein the foam sound-attenuating element has a proximal flange having a flange diameter, a middle portion having a middle-portion diameter that is smaller than the flange diameter, and a distal portion having a distal-portion diameter that is smaller than the middle-portion diameter and sized to be in a spaced-apart relation to the concave internal surface of the curved sound-attenuating distal flange of the pliable earpiece stem.

In some embodiments, the present invention provides a second method that includes: forming a single-piece pliable earpiece stem that includes: a handle portion having an exterior shape with a maximum diameter, a length, a proximal end and a distal end; a proximal flange located at the distal end of the handle portion, wherein the proximal flange has an outer-facing proximal surface and an inner-facing distal surface; an attachment portion having an exterior shape with a maximum diameter, a length, a proximal end and a distal end; a tapered stop located at the distal end of the handle portion, the tapered stop having a proximal surface extending radially outward at a proximal end of the tapered stop, a maximum diameter near the proximal end of the tapered stop and a minimum diameter near a distal end of the tapered stop; and a curved distal flange located at the distal end of the tapered stop, wherein the curved distal flange has a convex external surface and a concave internal surface, and wherein the tapered stop is located completely within the curved distal flange.

Some embodiments of the second method further include: providing a single-piece visco-elastic foam sound-attenuating element, wherein the foam sound-attenuating element has a proximal flange having a flange diameter that is larger than a largest diameter of the proximal flange, a middle portion having a middle-portion diameter that is smaller than the flange diameter, and a distal portion having a distal-portion diameter that is smaller than the middle-portion diameter and sized to be in a spaced-apart relation to the concave internal surface of the curved sound-attenuating distal flange of the pliable earpiece stem, wherein the visco-elastic foam sound-attenuating element has a length between a flat proximal surface of the proximal flange and a distal end surface of the distal portion, wherein the length of the visco-elastic foam sound-attenuating element is longer than a spacing between the outer proximal surface and the inner distal surface of the pliable earpiece stem, wherein the visco-clastic foam sound-attenuating element takes at least thirty (30) seconds to return to a default uncompressed shape after being released from a compressed shape, and wherein the pliable earpiece stem is made of a material having a durometer of about 35 Shore A; and positioning the visco-elastic foam sound-attenuating element on the earpiece stem to surround the attachment portion between the proximal flange and the proximal surface of the tapered stop.

Some embodiments of the second method further include: affixing the visco-elastic foam sound-attenuating element to the attachment portion of the earpiece stem with an adhesive.

Some embodiments of the second method further include: providing a single-piece visco-elastic foam sound-attenuating element positioned on the earpiece stem to surround the attachment portion between the proximal flange and the proximal surface of the tapered stop, wherein the foam sound-attenuating element has a proximal flange having a flange diameter that is larger than a largest diameter of the proximal flange, a middle portion having a middle-portion diameter that is smaller than the flange diameter, and a distal portion having a distal-portion diameter that is smaller than the middle-portion diameter and sized to be in a spaced-apart relation to the concave internal surface of the curved sound-attenuating distal flange of the pliable earpiece stem, wherein the visco-elastic foam sound-attenuating element takes at least five (5) seconds to return to a default uncompressed shape after being released from a compressed shape, and wherein the pliable earpiece stem is made of a material having a durometer of between about 30 Shore A and about 40 Shore A, inclusive.

Some embodiments of the second method further include: forming the pliable earpiece stem of a material having a durometer of about 35 Shore A.

Some embodiments of the second method further include: forming the pliable earpiece stem of a material having a durometer of between about 30 Shore A and about 40 Shore A, inclusive.

In some embodiments of the second method, the forming of the single-piece pliable earpiece stem further includes forming a continuous channel extending through the pliable earpiece stem from the proximal end of the handle portion through the distal surface of the curved distal flange.

In some embodiments of the second method, the forming of the single-piece pliable earpiece stem further includes forming an interior of the pliable earpiece stem as solid with no through channel.

In some embodiments of the second method, the forming of the single-piece pliable earpiece stem further includes forming a continuous channel extending through the pliable earpiece stem from the proximal end of the handle portion through the distal surface of the curved distal flange, and wherein the channel has a first axis within the handle portion and a second axis within the attachment portion, the tapered portion and the distal flange, and wherein an angle between the first axis and the second axis is, or is about, 135 degrees.

In some embodiments of the second method, the forming of the single-piece pliable earpiece stem further includes forming a continuous channel extending through the pliable earpiece stem from the proximal end of the handle portion through the distal surface of the curved distal flange, and wherein the channel has a first axis within the handle portion and a second axis within the attachment portion, the tapered portion and the distal flange, and the first axis and the second axis are colinear.

Some embodiments of the second method further include: providing a single-piece foam sound-attenuating element positioned on the earpiece stem to surround the attachment portion between the proximal flange and the proximal surface of the tapered stop, wherein the foam sound-attenuating element has a proximal flange having a flange diameter, a middle portion having a middle-portion diameter that is smaller than the flange diameter, and a distal portion having a distal-portion diameter that is smaller than the middle-portion diameter and sized to be in a spaced-apart relation to the concave internal surface of the curved sound-attenuating distal flange of the pliable earpiece stem.

In some embodiments, the present invention provides a sound-attenuation system that includes: a visco-elastic foam sound-attenuating element having an interior channel; and a single-piece pliable earpiece stem that includes: a curved sound-attenuating distal flange, a tapered stop portion that is connected to the distal flange, an attachment portion that is attached to the tapered stop portion, a proximal flange that is attached to the attachment portion, and a handle portion that is attached to the proximal flange, wherein the distal flange has a convex external surface and a concave interior surface, wherein the tapered stop portion has an exterior surface located within, and spaced apart from, the concave interior surface of the distal flange, wherein the attachment portion has an exterior surface having a maximum diameter, wherein the interior channel of the visco-clastic foam sound-attenuating element has a default interior channel diameter that is smaller than the exterior diameter of the attachment portion, wherein the visco-clastic foam sound-attenuating element is stretched and placed on the single-piece pliable stem such that the interior channel of the visco-clastic foam sound-attenuating element conforms to the exterior surface of the attachment portion, wherein the visco-clastic foam sound-attenuating element takes at least five (5) seconds to return to a default uncompressed exterior shape after being released from a compressed shape, and wherein sound-attenuating stem and the foam sound-attenuating element together are configured to fit into a human user's car. In some embodiments, the visco-elastic foam sound-attenuating element takes at least sixty (60) seconds to return to a default uncompressed exterior shape after being released from a compressed shape. In some embodiments, the visco-elastic foam sound-attenuating element takes at least forty-five (45) seconds to return to a default uncompressed exterior shape after being released from a compressed shape. In some embodiments, the visco-clastic foam sound-attenuating element takes at least thirty (30) seconds to return to a default uncompressed exterior shape after being released from a compressed shape. In some embodiments, the visco-elastic foam sound-attenuating element takes at least fifteen (15) seconds to return to a default uncompressed exterior shape after being released from a compressed shape.

In some embodiments of the sound-attenuation system, the handle portion has a proximal end, and wherein the pliable earpiece stem has a continuous sound-conducting stem channel extending through the pliable earpiece stem from the proximal end of the handle portion through the distal external surface of the curved distal flange.

Some embodiments of the sound-attenuation system further include, a sound filter configured to insert into the sound-conducting channel in the handle portion, the sound filter including lengthwise filter channel open to the stem channel, and a cover that is selectably movable to either occlude the filter channel or to open the filter channel to pass external sounds and air pressure.

In some embodiments of the sound-attenuation system, an interior of the pliable earpiece stem is solid with no through channel.

In some embodiments of the sound-attenuation system, the visco-elastic foam sound-attenuating element takes at least five (5) seconds to return to a default uncompressed shape after being released from a compressed shape.

In some embodiments of the sound-attenuation system, the pliable earpiece stem is made of a material having a durometer of between about 30 Shore A and about 40 Shore A, inclusive. In some embodiments, the pliable earpiece stem is made of a material having a durometer of about 35 Shore A. In some embodiments, the pliable earpiece stem is made of a material having a durometer of about 35 Shore A (i.e., 32 to 38 Shore A). In some embodiments, the pliable earpiece stem is made of a material having a durometer of about 30 Shore A (i.e., 27 to 33 Shore A). In some embodiments, the pliable earpiece stem is made of a material having a durometer of about 40 Shore A (i.e., 37 to 43 Shore A). In some embodiments, the pliable earpiece stem is made of a material having a durometer of about 45 Shore A (i.e., 42 to 48 Shore A).

It is to be understood that the above description is intended to be illustrative, and not restrictive. Although numerous characteristics and advantages of various embodiments as described herein have been set forth in the foregoing description, together with details of the structure and function of various embodiments, many other embodiments and changes to details will be apparent to those of skill in the art upon reviewing the above description. The scope of the invention should be, therefore, determined with reference to the appended claims, along with the full scope of equivalents to which such claims are entitled. In the appended claims, the terms "including" and "in which" are used as the plain-English equivalents of the respective terms "comprising" and "wherein," respectively. Moreover, the terms "first," "second," and "third," etc., are used merely as labels, and are not intended to impose numerical requirements on their objects.

What is claimed is:

1. A first sound-attenuation system for placement at least partially in an ear canal of a person, the first sound-attenuation system comprising:

a pliable base having an emitter end and a receiver end, wherein the pliable base includes:

a first flange at the emitter end of the pliable base, wherein the first flange is cup-shaped, having a convex external surface generally facing the emitter end of the pliable base and configured to engage the ear canal to create a seal in the ear canal, and wherein the first flange has a concave inner surface generally facing the receiver end of the pliable base;

a stop section having a proximal top surface located within the cup-shaped first flange, wherein the stop section has an emitter end and a receiver end;

a sound-attenuation plug having an emitter end and a receiver end, wherein the sound-attenuation plug includes a first channel that passes through an entire length of the sound-attenuation plug, wherein the sound-attenuation plug is configured to couple over the pliable base such that the emitter end of the sound-attenuation plug is held in place by the receiver end of the stop section and at least a portion of the sound-attenuation plug extends within the cup-shaped first flange.

2. The first sound-attenuation system of claim 1, wherein the receiver end of the pliable base has a first longitudinal axis, wherein the emitter end of the pliable base has a second longitudinal axis, and wherein the first longitudinal axis is at a first angle relative to the second longitudinal axis.

3. The first sound-attenuation system of claim 2, wherein the first angle is 180 degrees.

4. The first sound-attenuation system of claim 2, wherein the first angle is between about 100 degrees and about 170 degrees.

5. The first sound-attenuation system of claim 1, wherein the pliable base further includes a second flange configured to hold the receiver end of the sound-attenuation plug in place.

6. The first sound-attenuation system of claim 5, wherein the sound-attenuation plug further includes:

a proximal flange having a flange diameter that is larger than a largest diameter of the second flange of the pliable base, a middle portion having a middle-portion diameter that is smaller than the flange diameter of the proximal flange, and a distal portion having a distal-portion diameter that is smaller than the middle-portion diameter and sized to be in a spaced-apart relation to the concave inner surface of the first flange of the pliable base.

7. The first sound-attenuation system of claim 1, wherein the pliable base further includes a second channel that passes through an entire length of the pliable base.

8. The first sound-attenuation system of claim 1, wherein an outer diameter of the pliable base decreases from the receiver end of the pliable base to the emitter end of the pliable base.

9. The first sound-attenuation system of claim 1, wherein the sound-attenuation plug includes a foam body.

10. The first sound-attenuation system of claim 1, wherein the stop section has a conical frustum shape having a first diameter at the receiver end of the stop section and a second diameter at the emitter end of the stop section, and wherein the first diameter is larger than the second diameter.

11. The first sound-attenuation system of claim 1, wherein the sound-attenuation plug takes at least five (5) seconds to return to a default uncompressed exterior shape after being released from a compressed shape.

12. The first sound-attenuation system of claim 1, wherein the pliable base includes:

a handle portion (1530) that includes an exterior shape with a maximum diameter (1532), a length, a proximal end (1536), and a distal end (1537);

a proximal flange (1510) located at the distal end of the handle portion (1530), wherein the proximal flange (1510) has an outward-facing proximal surface (1514) and an inward-facing distal surface (1516);

an attachment portion (1540) having an exterior shape with a maximum diameter, a length, a proximal end and a distal end;

wherein the stop section is tapered and the proximal top surface (1556) extends radially outward at a proximal end of the stop section, and has a maximum diameter (1551) near the proximal end of the tapered stop section and a minimum diameter (1552) near a distal end of the tapered stop section; and wherein the sound-attenuation plug is made of a visco-elastic foam polymer.

* * * * *